Feb. 2, 1943.　　R. HASTINGS, JR　　2,309,730
SIDE DELIVERY TRANSPORTING MACHINE
Filed Feb. 15, 1941　　13 Sheets-Sheet 1

Inventor.
Russell Hastings Jr.
by Heard Smith & Tennant.
Attys.

Feb. 2, 1943.  R. HASTINGS, JR  2,309,730
SIDE DELIVERY TRANSPORTING MACHINE
Filed Feb. 15, 1941  13 Sheets-Sheet 2

Inventor.
Russell Hastings Jr.
by Heard Smith & Tennant.
Attys.

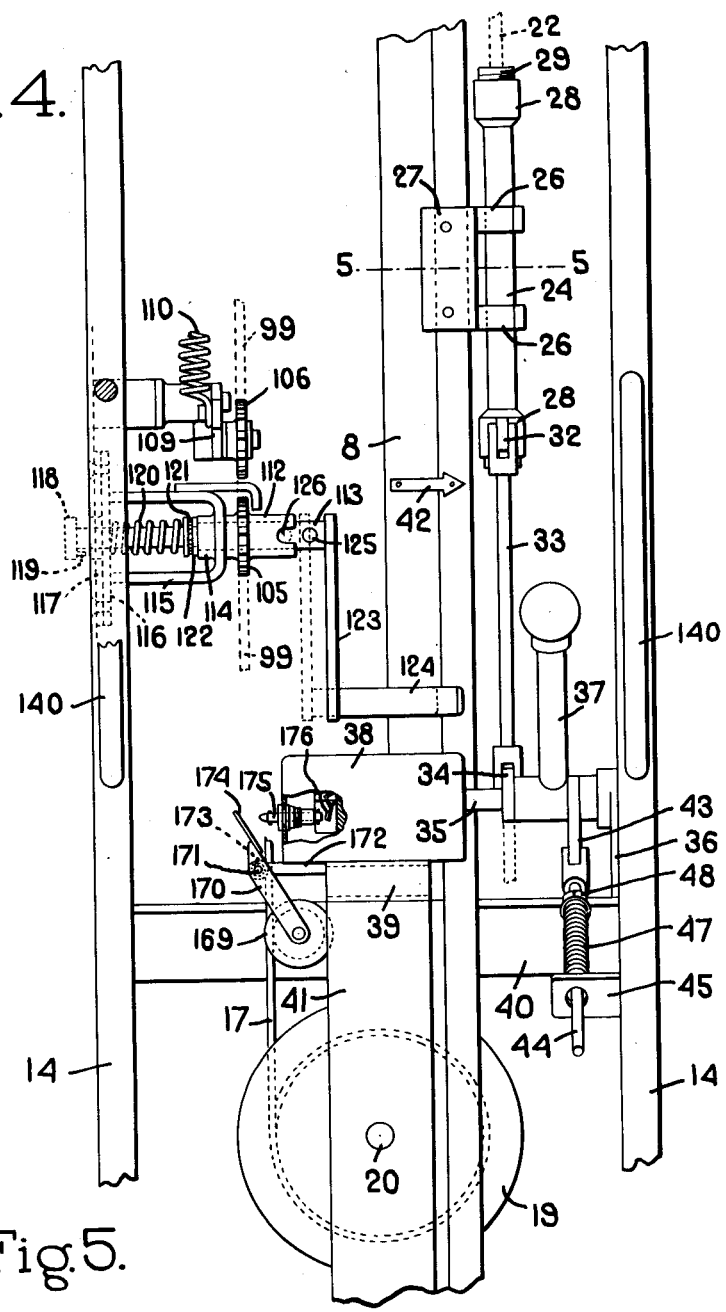
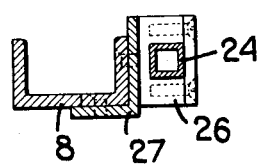

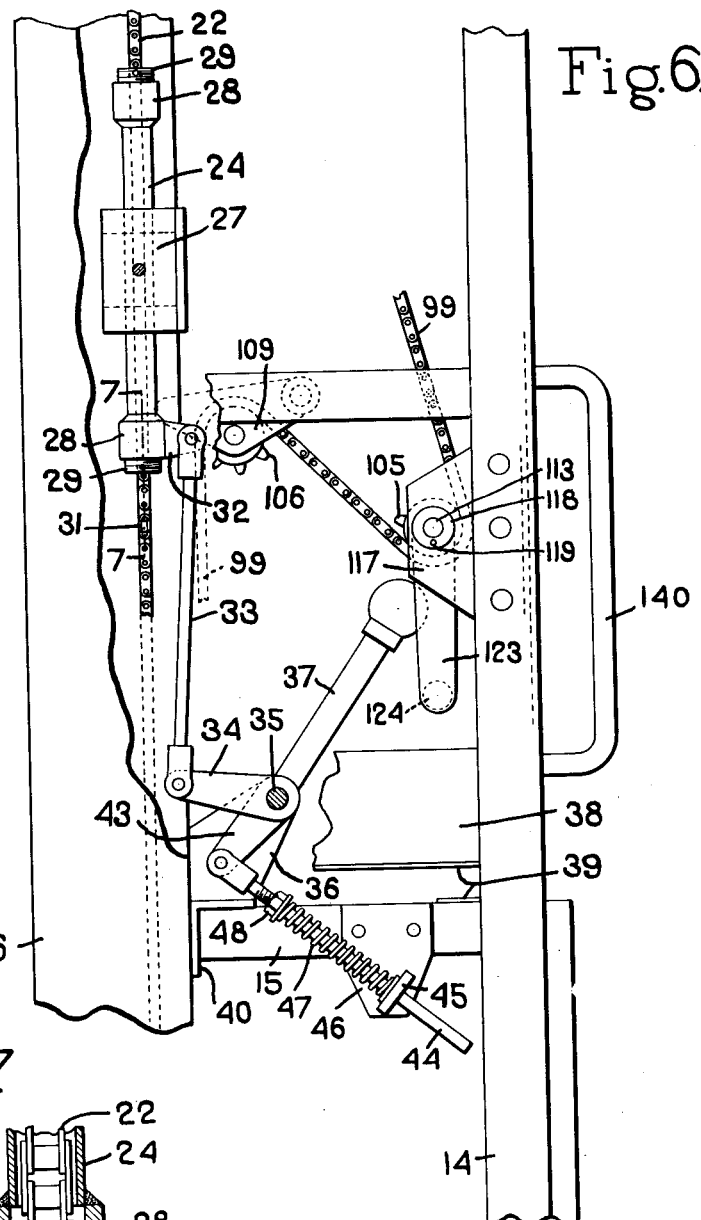
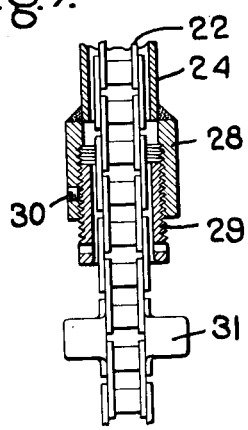

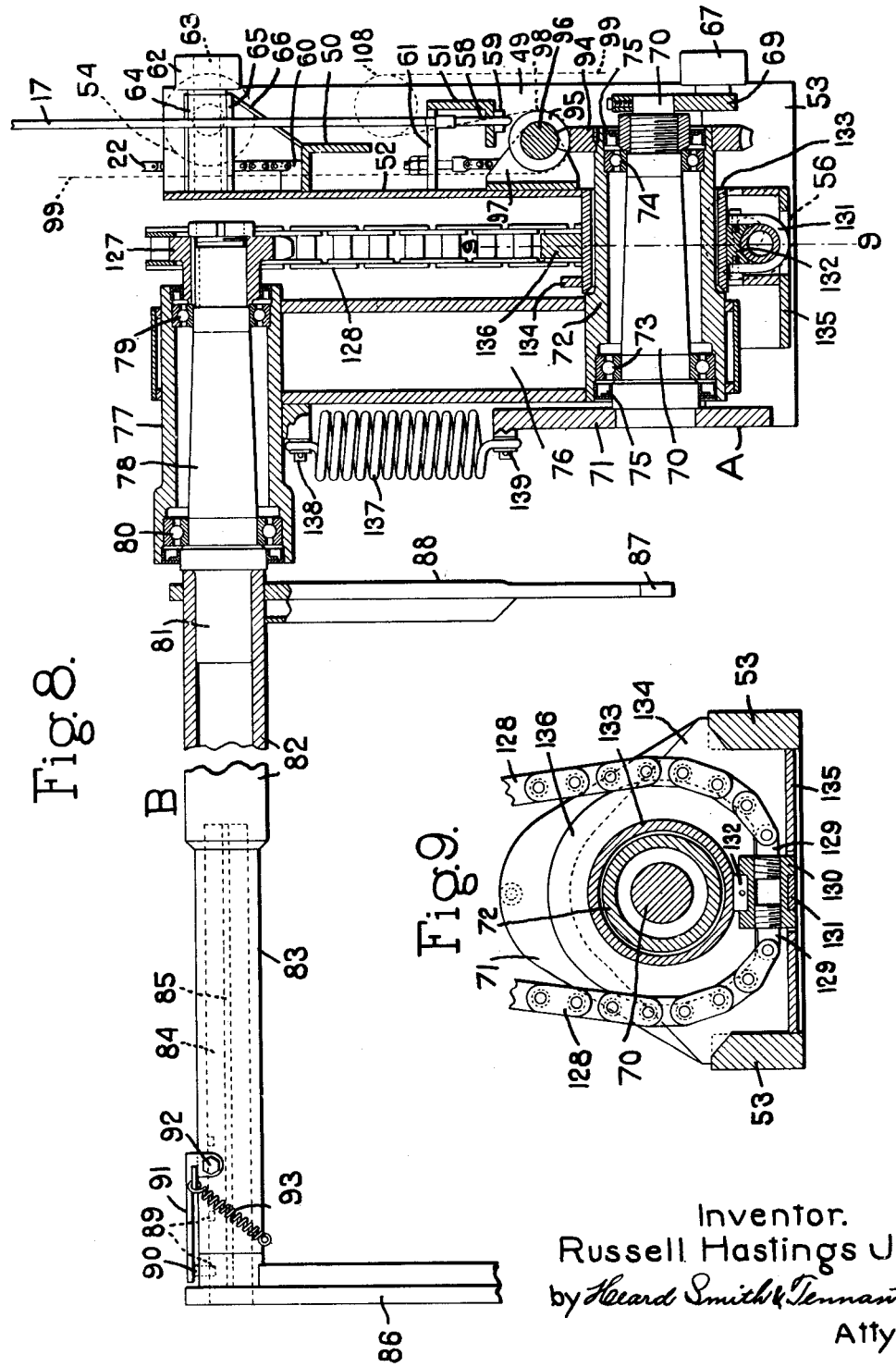

Feb. 2, 1943. R. HASTINGS, JR 2,309,730
SIDE DELIVERY TRANSPORTING MACHINE
Filed Feb. 15, 1941 13 Sheets-Sheet 6

Inventor.
Russell Hastings Jr.
by Heard Smith & Tennant.
Attys.

Feb. 2, 1943.   R. HASTINGS, JR   2,309,730
SIDE DELIVERY TRANSPORTING MACHINE
Filed Feb. 15, 1941   13 Sheets-Sheet 7

Inventor.
Russell Hastings Jr.
by Heard Smith & Tennant
Attys.

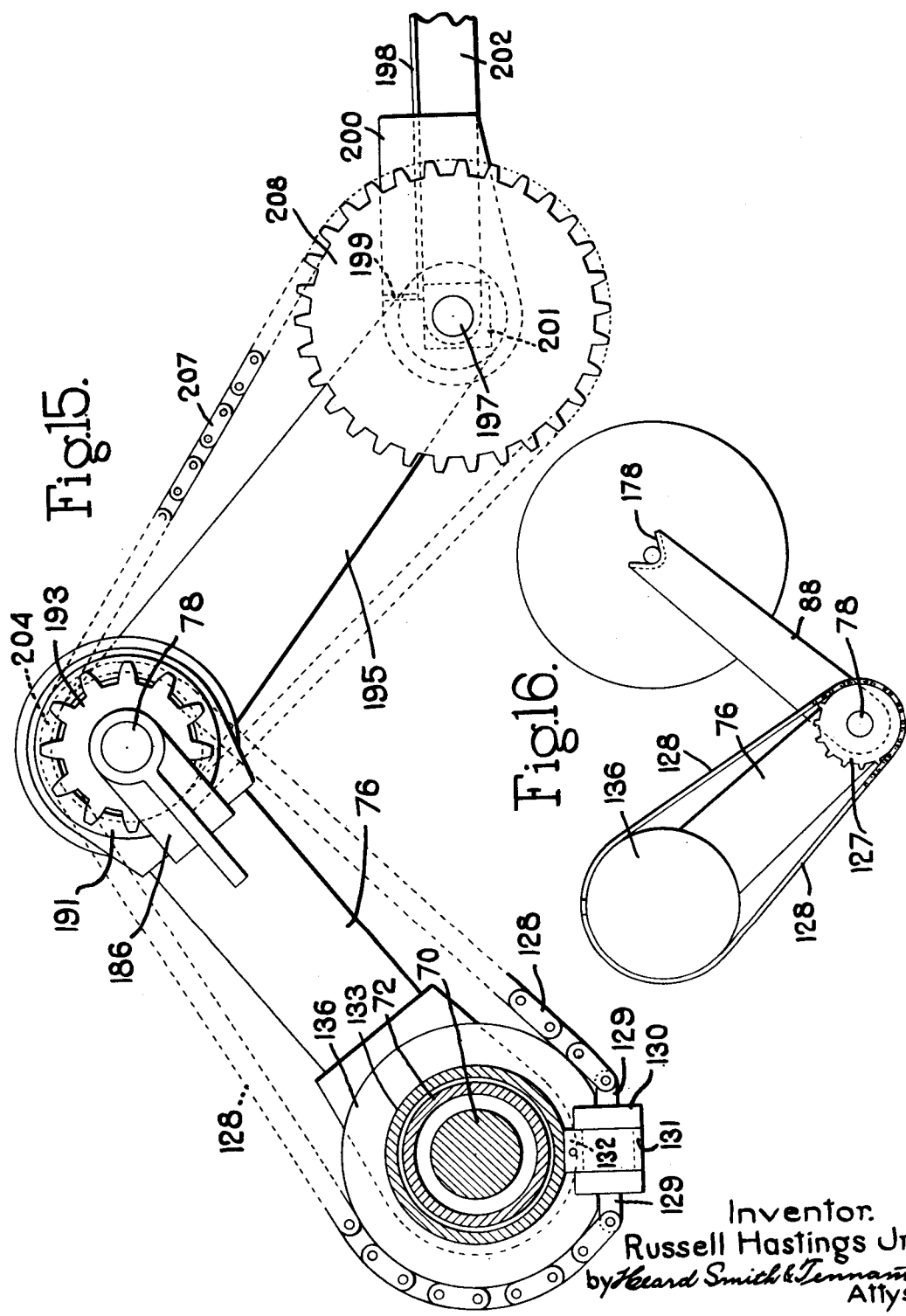

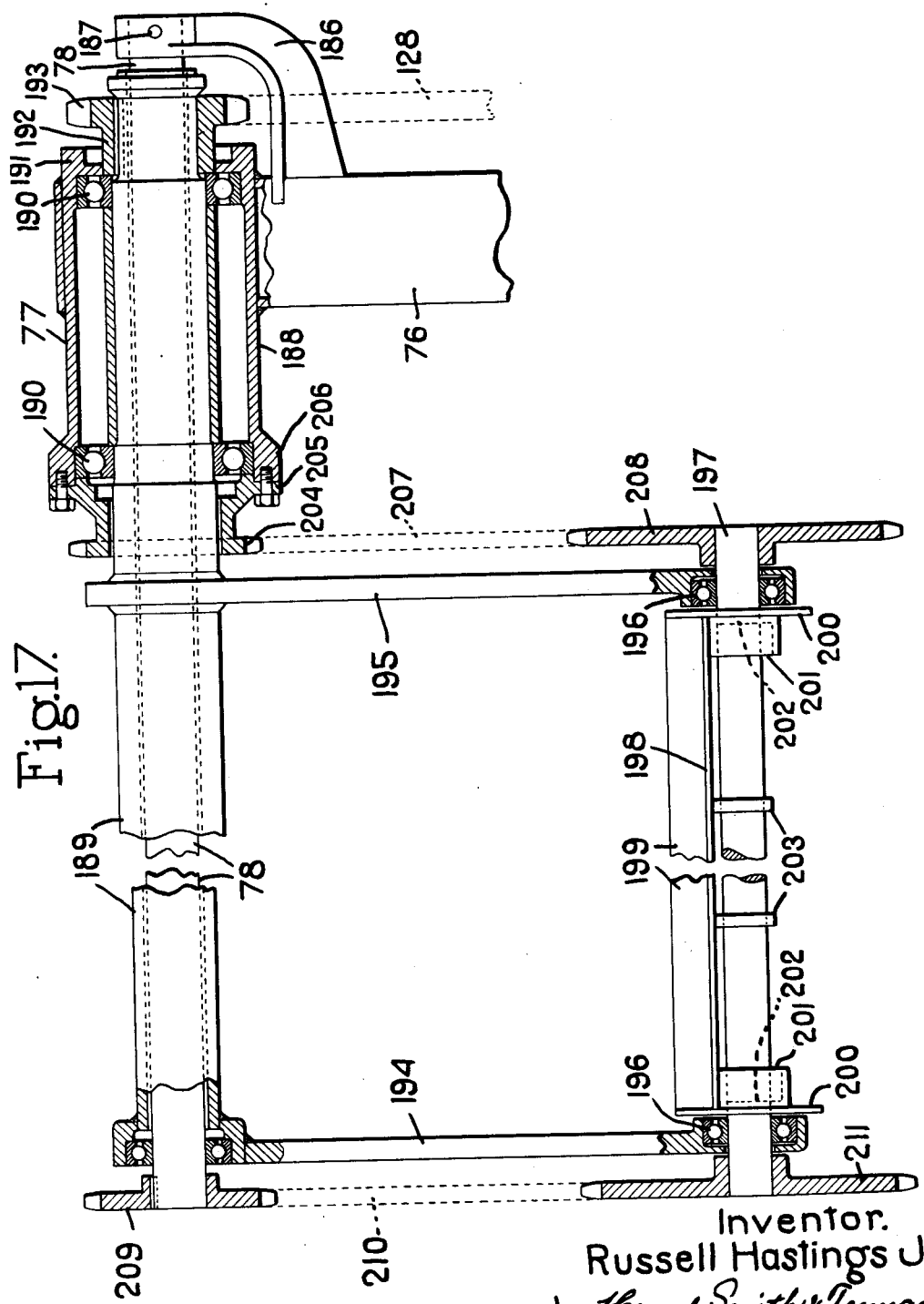

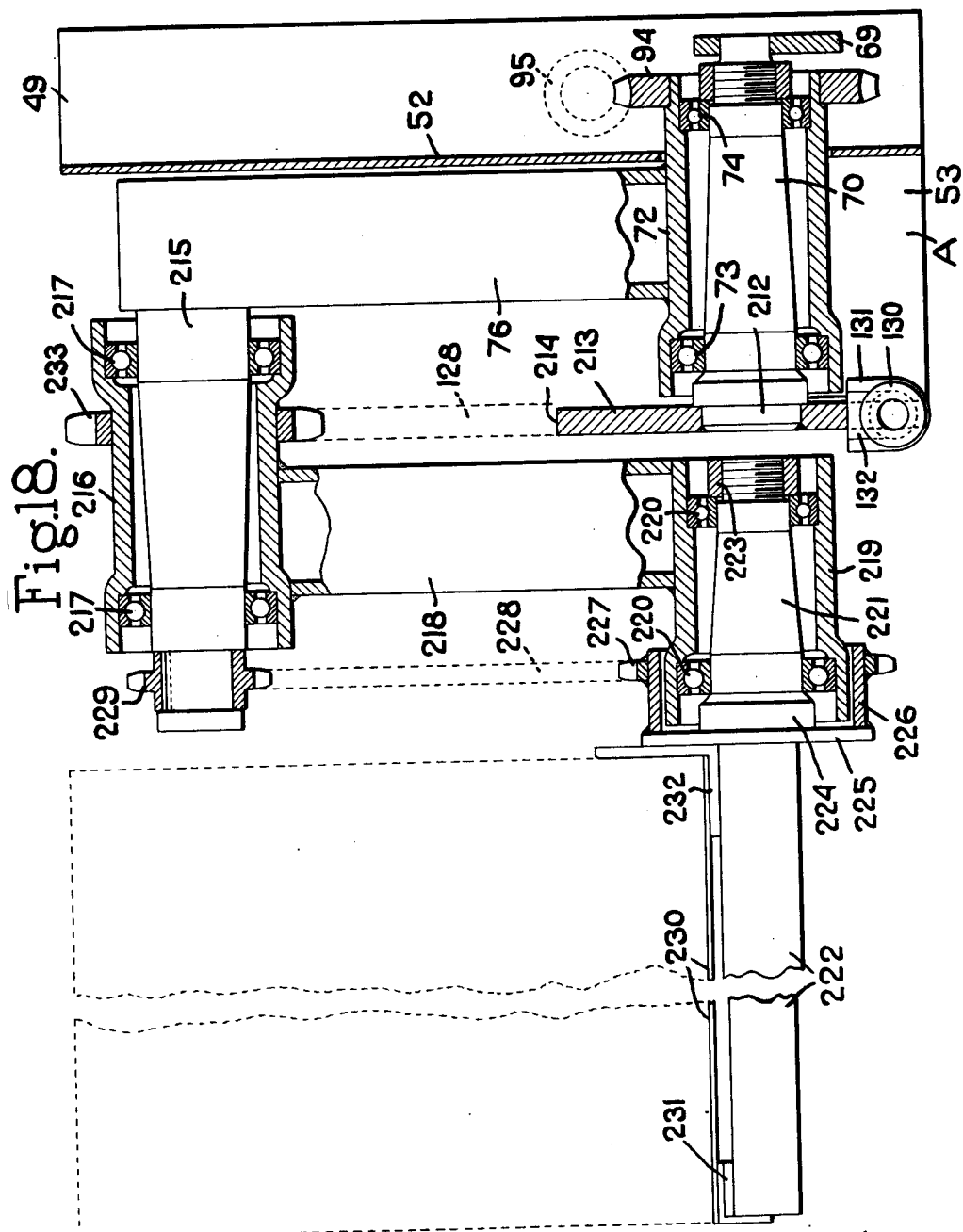

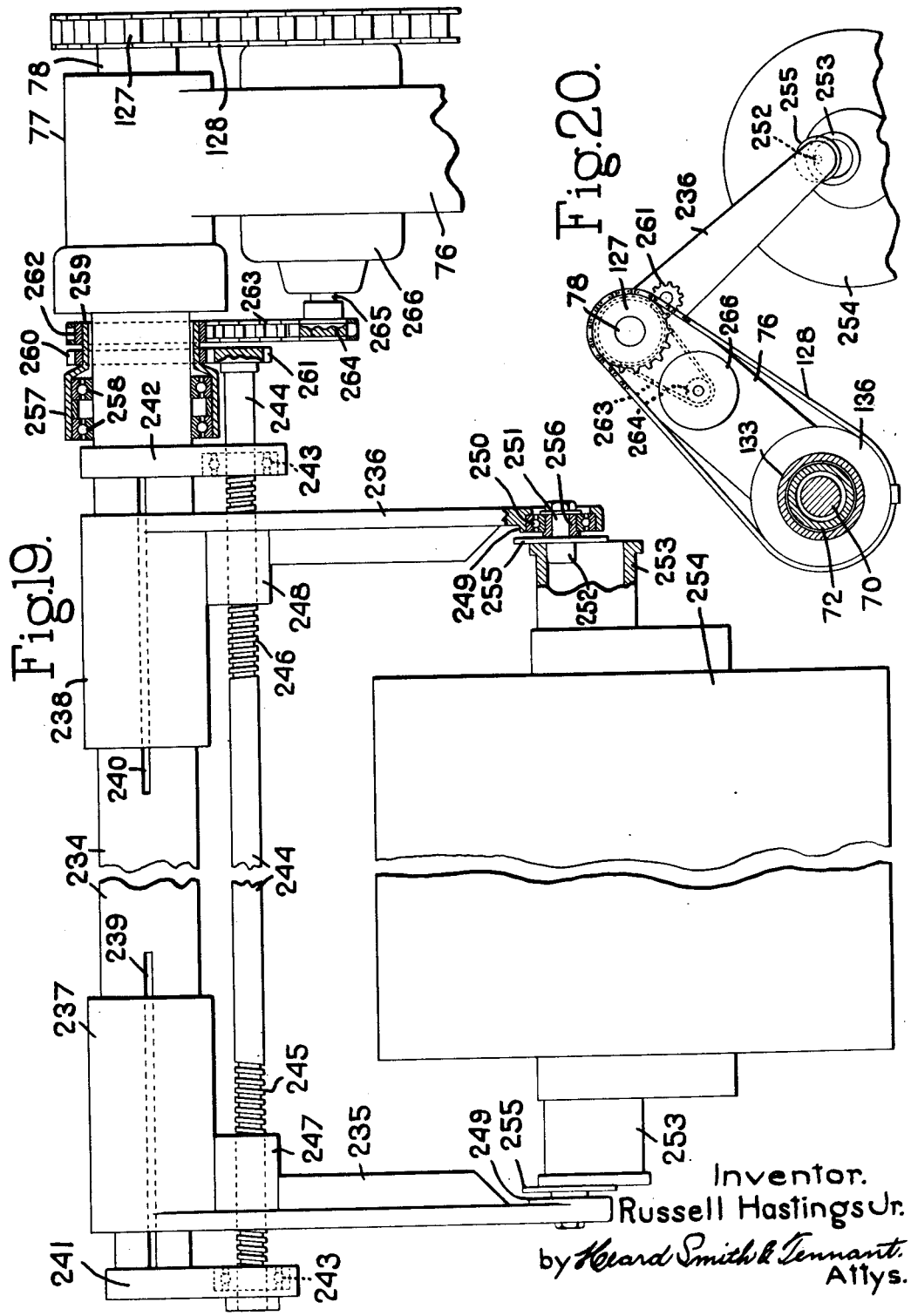

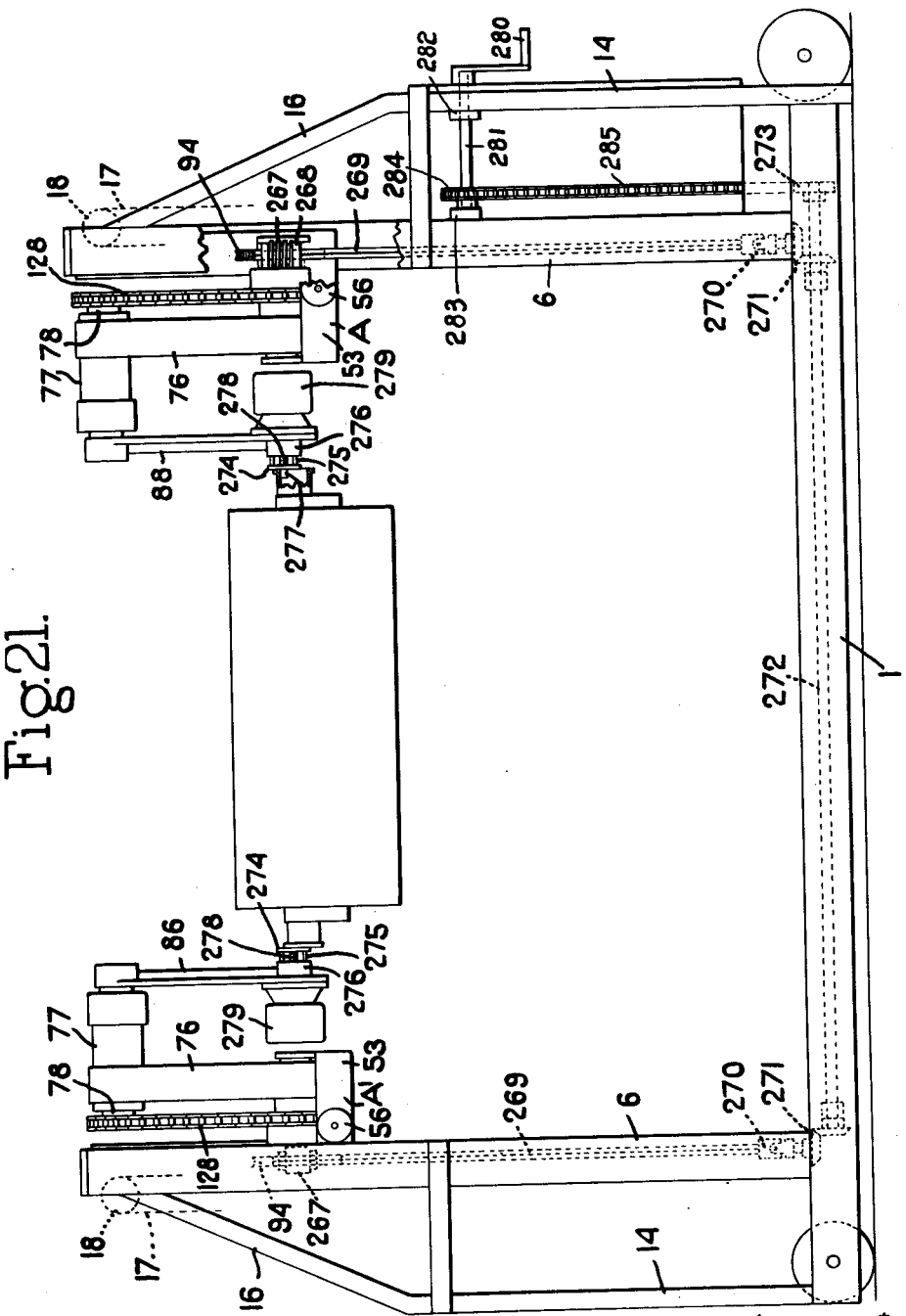

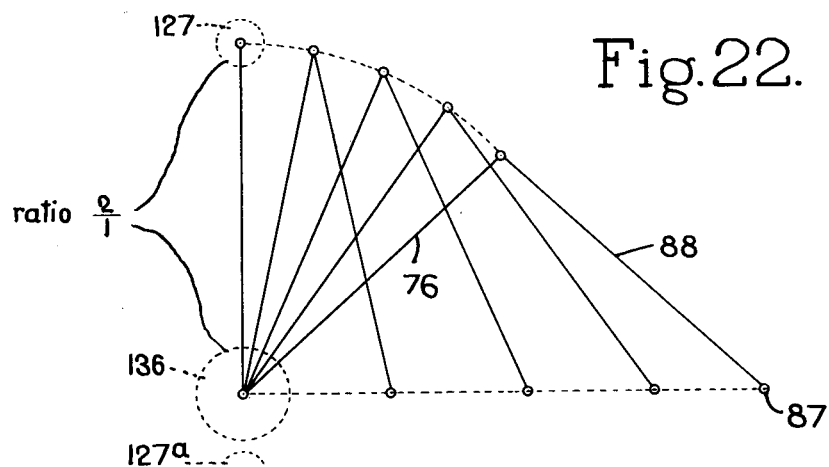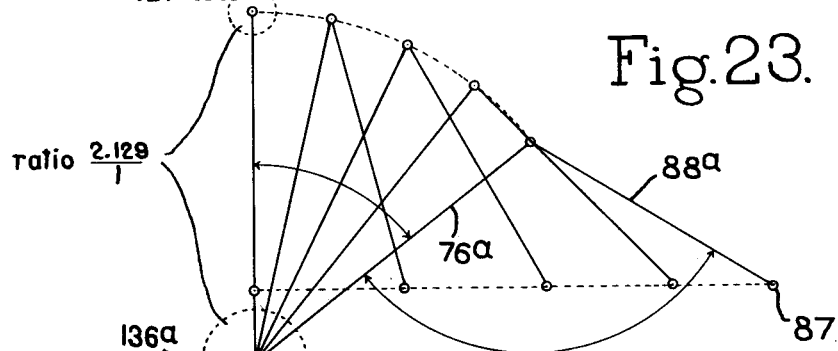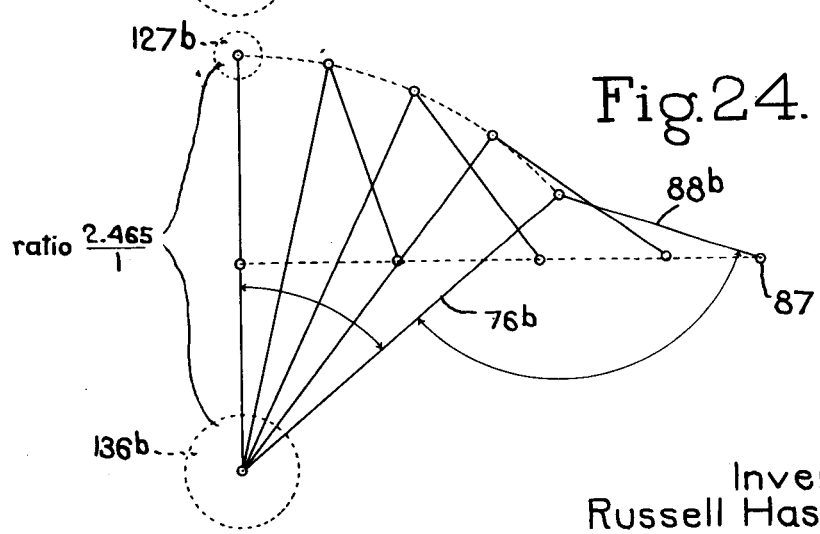

Patented Feb. 2, 1943

2,309,730

UNITED STATES PATENT OFFICE 2,309,730

SIDE DELIVERY TRANSPORTING MACHINE

Russell Hastings, Jr., Wellesley Hills, Mass., assignor to Lewis-Shepard Company, Watertown, Mass., a corporation of Massachusetts Application February 15, 1941, Serial No. 379,107

29 Claims. (Cl. 212—10)

This invention relates to improvements in side delivery transporting machines and the principal object of the invention is to provide mechanism for transporting an article laterally in a substantially straight line without substantial frictional or other resistance to the relatively moving article-supporting and transporting mechanism.

More particularly the invention relates to improvements in portable hoisting machines having a wheel-supported base provided with uprights upon which a vertically movable carriage is mounted and provided with means for supporting the load over the base for transportation and for enabling the load to be moved laterally from or toward such position.

In usual side delivery hoisting machines the vertically movable carriage is provided with rollers so positioned as to permit the articles to be slid laterally from the carriage or with members slidably supported on rollers on track-like guides on the carriage which will permit the side delivery members to be extended beyond the side of the base. Furthermore, in such constructions free movement of the side delivery mechanism is likely to be impeded by accumulated dirt, or by other obstructions, thereby interfering with the efficiency of the mechanism. In other side delivery hoisting machines the vertically movable carriage is provided with a tilting platform but such platforms do not extend any substantial distance beyond the side or sides of the base of the machine and require manual manipulation of the article to place it in the desired position.

Another object of the invention is to provide a side delivery transporting mechanism which will not require the use of rollers or sliding supports for the article and in which the relatively movable members for supporting and transporting the article may be mounted in dust-proof bearings and so constructed and so correlated in their movements as to transport the article in a substantially straight line.

A further object of the invention is to provide a hoisting machine having a vertically movable carriage with side delivery mechanism so constructed that the hoisting machine may be introduced into and removed from a narrow aisle between storage racks and in which the side delivery mechanism is so constructed as to enable the article to be automatically deposited upon or lifted from a storage rack and positioned over the base of the hoisting machine for transportation.

More specifically an object of the invention is to provide a portable hoisting machine adapted to transport articles, such for example as warp beams, into and out of narrow aisles located between storage racks and having means operable automatically to deliver the articles upon said racks at any desired height, or to remove the same therefrom without requiring manual handling of the articles and which mechanism is also operable automatically to position the articles, such as warp beams, upon supports upon the machines in which they are to be used, thus avoiding the use of dollies which are ordinarily provided for such purpose.

Another object of the invention is to provide a portable hoisting machine for cylindrical articles having a central shaft comprising a wheel-supported base having vertical uprights upon which is mounted a vertically movable carriage having pivotally mounted thereon a main transporting arm provided with a boom extending longitudinally of said base with rigid supplemental article-transporting means rotatably mounted on the free end of said main arm, such as a supplemental swinging article-supporting arm or arms carried by said boom, and means for correlating the swinging movement of said main and supplemental transporting means to move the article laterally with respect to said carriage in a substantially straight horizontal line, whereby the article can be moved from a position beyond the base of the hoisting machine over said base for transportation and from said base beyond the side thereof to deposit it upon a storage rack or upon a suitable support.

A further object of the invention is to provide supplemental transporting means with pivotally mounted article-supporting means and providing means for mainaining the article-supporting means horizontally throughout the lateral swinging movements of the main and supplemental transporting means.

Another object of the invention is to provide the supplemental arms with automatically operable means for engaging the shaft of a warp beam or other article to be transported.

Another object of the invention is to provide means, mounted at a convenient height upon the frame of the hoisting machine, for actuating the side delivery mechanism when the carriage is in any position.

Another object of the invention is to provide novel controlling mechanism for automatically arresting the carriage at any predetermined upper and lower limitation of its movement, together with manually controlled means for accurately arresting the carriage at any desired height intermediate of such upper and lower limitations.

Another object of the invention is to provide means for locking the wheel-supported hoisting machine to the floor, and preferably including a platform on which the operator may stand during the manual actuation by him of the side delivery mechanism.

These and other objects and features of the invention will more fully appear from the following description and the accompanying drawings and will be particularly pointed out in the claims.

Illustrative embodiments of the invention are shown in the accompanying drawings in which:

Fig. 1 is a side elevation of a hoisting machine designed for transportation and side delivery of a warp beam or the like.

Fig. 4 is an enlarged detail view of the controlling mechanism for raising and lowering the load supporting means and also showing a part of the mechanism for effecting side delivery of the load.

Fig. 5 is an enlarged horizontal sectional view on lines 5—5, Fig. 3, of a portion of the control mechanism.

Fig. 6 is an enlarged view of portions of the frame, the control mechanism for the vertically movable load supporting means and the portion of the side delivery mechanism.

Fig. 7 is an enlarged detail longitudinal sectional view on line 7—7, Fig. 6, of the portion of the controlling mechanism.

Fig. 8 is an enlarged detail view mainly in vertical section of the vertically movable carriage, the boom which is mounted thereon and the mechanism for swinging the boom in such manner as to move the load supported thereby in a straight horizontal line.

Fig. 9 is a sectional detail view on line 9—9, Fig. 8.

Figure 12:
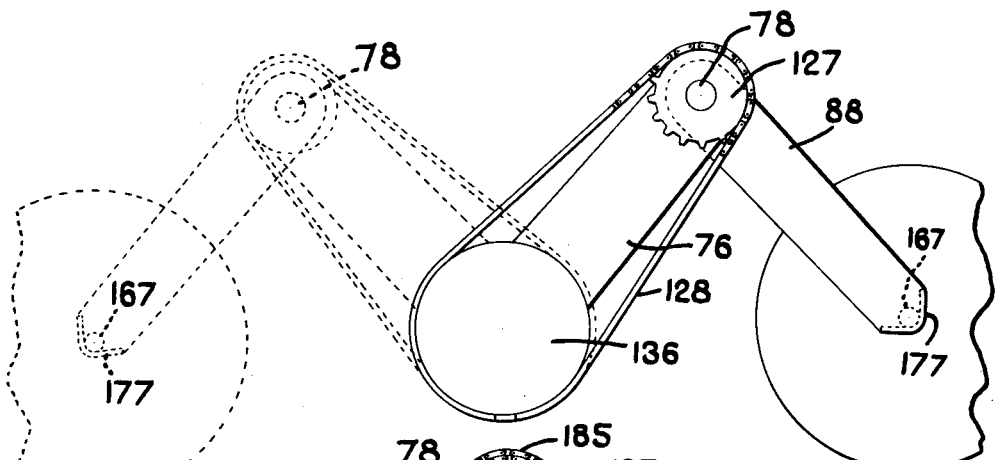

Fig. 12 is a diagrammatic view of the main arm and one of the supplemental arms supporting the shaft of a cylindrical article illustrating in full lines the position of the arms and article when swung in one direction and in dotted lines the position thereof when swung in the opposite direction, showing means for supporting the shaft of the cylindrical article in such manner that it will not be disengaged from the shaft by the swinging movement of the arms.

Figure 13:
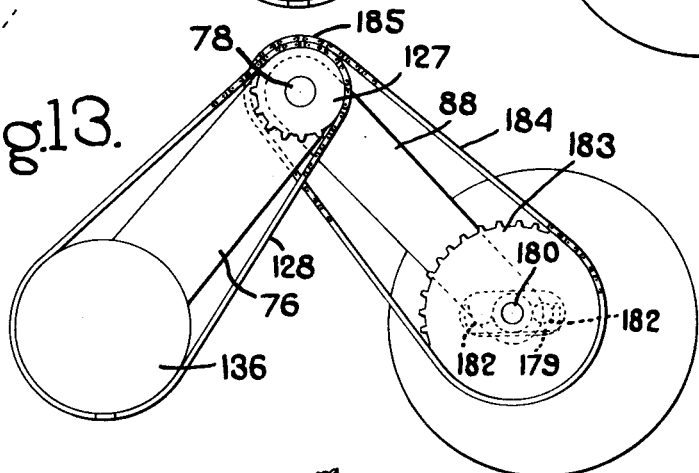

Fig. 13 is a diagrammatic view of the main arm and one of the supplemental arms showing a shaft journaled in the ends of the supplemental arms and having rigid therewith an article-supporting device having sockets located horizontally upon each side of said shaft, and chain and sprocket gearing for maintaining the article-supporting means in horizontal position throughout the lateral swinging movements of the main and supplemental arms in either direction.

Figure 14:
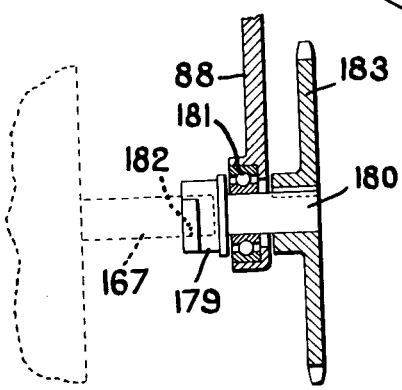

Fig. 14 is a view partly in vertical section showing the shaft which is mounted in the end portion of the supplemental arm, the sprocket gear secured to the shaft and the article-supporting means upon the shaft engaging the shaft of the cylindrical article which is illustrated in dotted lines.

Fig. 15 is a detail view of a form of main and supplemental arm construction of the type illustrated in Fig. 13 in which the article-supporting means is in the form of a horizontal frame or platform rigidly secured upon the shaft which is mounted in the ends of the supplemental arms.

Fig. 16 is a modified view of the construction shown in Fig. 12 in which the main arm extends downwardly and the supplemental arm extends upwardly from the lower end of the main arm, with means for engaging the shaft of the cylindrical article which will prevent disengagement during the swinging movements of said main and supplemental arms.

Fig. 17 is a side elevation, partly in vertical section, of the construction shown in Fig. 15.

Fig. 18 shows a modification of the constructions illustrated in Figs. 15 and 17 in which a single supplemental arm is employed instead of parallel supplemental arms.

Fig. 19 illustrates a modification of the construction illustrated in Figs. 15 and 17 in which the supplemental arms are slidably mounted upon a rotatable cylindrical boom and electrically driven means provided for simultaneously moving the supplemental arms toward or from each other to engage a hollow shaft of a cylindrical article and to center the same between said arms and operable when simultaneously moved in the opposite direction to release the article-supporting means from said shaft.

Fig. 20 is an end elevation on a smaller scale of the construction shown in Fig. 19, showing the relative positions of the main and swinging arms and the article-engaging means of the supplemental arms engaging the hollow shaft of the article, and showing in vertical section the concentric members for supporting and actuating the main and supplemental arms as illustrated in Fig. 19, Fig. 21 illustrates the embodiment of the invention in a construction which comprises spaced uprights mounted respectively on the end portions of a wheel-supported frame, simultaneously movable carriages mounted on said uprights provided with main and supplemental swinging arms simultaneously movable in parallelism, and also illustrating slidable article-engaging means mounted in the ends of the respective arms, and electrically operated means for simultaneously moving the article-engaging means into and out of article-engaging positions, Fig. 22 is a graphic illustration of the relative movements of main and supplemental arms of equal length having a gearing ratio of 2 to 1 for correlating the ratio of the angular motion of said arms to move the load supporting means in a horizontal path throughout the amplitude of the swinging movements of said arms;

Fig. 23 is a similar graphic illustration of the movements of main and supplemental arms the length of which have a ratio of 5 to 4 with power transmitting mechanism having suitable gearing ratio to cause such angular relative movements of the supplemental arm relative to that of the main arm as to move the load supporting means in a line very closely approximating the horizontal line throughout the amplitude of movement of said arms; and, Fig. 24 is a similar graphic illustration of the movements of main and supplemental arms the length of which have a ratio of 2 to 1 with power transmitting mechanism having suitable gearing ratio to cause such angular relative movements of the supplemental arm relative to that of the main arm as to move the load supporting means in a line very closely approximating the horizontal line throughout the amplitude of movement of said arms.

The preferred embodiments of the invention are illustrated herein as applied to a hoisting machine for transporting heavy rolls, such as warp beams which are employed in the textile industry, but it will be understood that the invention may be readily adapted to other uses.

The main objects of the invention are to provide a construction for transporting warp beams or various other articles through narrow aisles between storage racks and having a vertical movable carriage provided with laterally swinging means adapted to move the supported article horizontally in a substantially straight line when the carriage is at any desired elevation, so that it may be deposited upon or removed from the rack automatically without the necessity of manual manipulation. The construction is also such that a warp beam or like article can be transported along a narrow aisle between textile machines and automatically deposited upon the usual warp beam supports of the machine.

The invention also comprises other important features including novel automatic mechanism for limiting the upward and downward movements of the carriage with manually operable means for accurately arresting the carriage at any desired height. It also includes the manually operable means for actuating the side delivery mechanism when the vertically movable carriage is positioned at any desired height.

Various modifications of the side delivery mechanism which are also illustrated indicate the adaptability of the invention to various uses and conditions.

Figure 1:
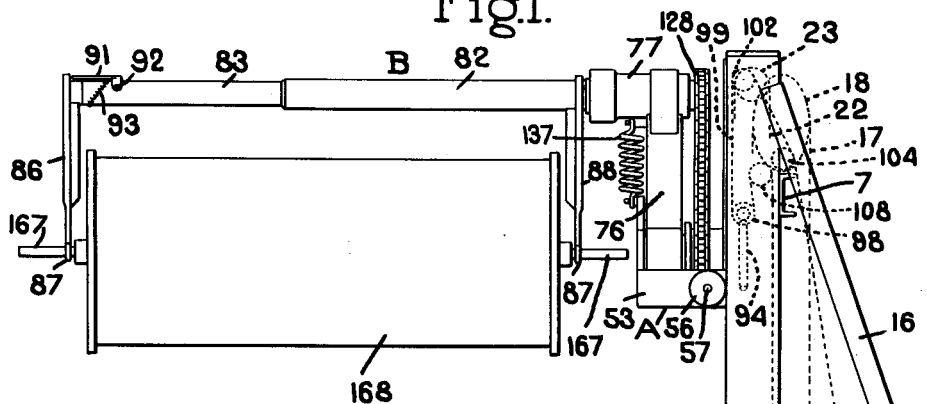
Figure 2:
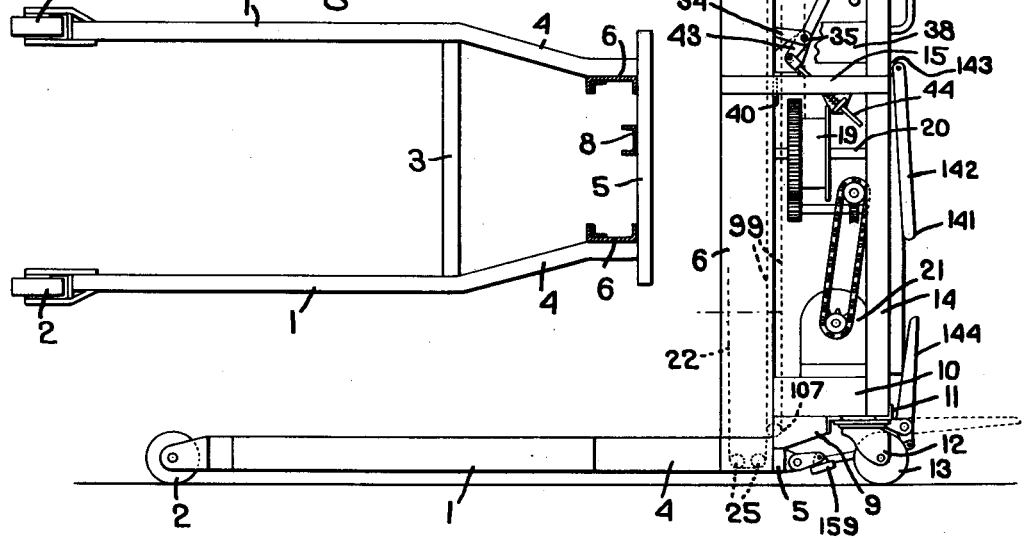
Fig. 2 is a plan view of the base of the machine with uprights extending therefrom shown in horizontal section.
Figure 10:
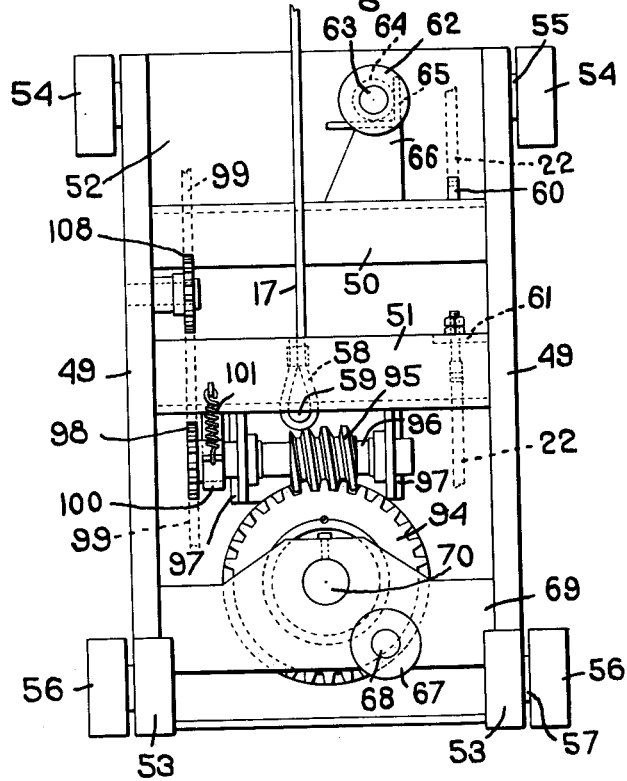
Fig. 10 is a front elevation of the vertically movable carriage.
Figure 11:
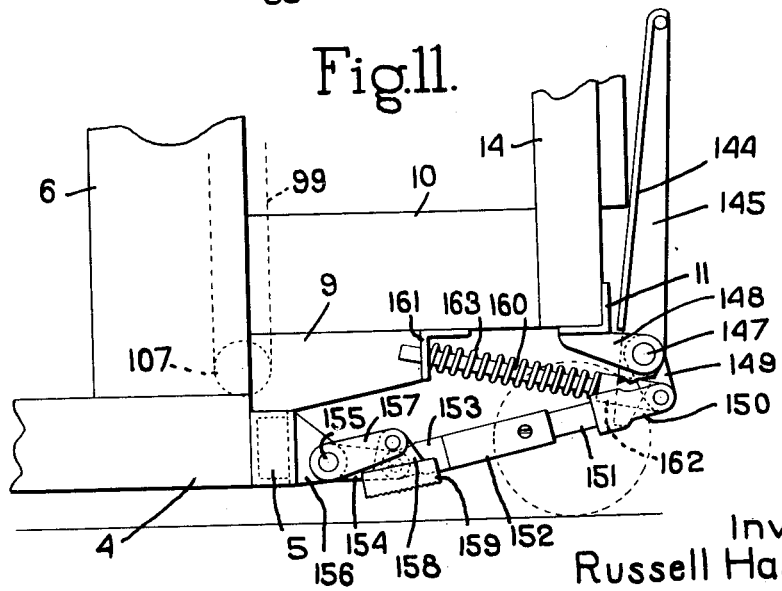
Fig. 11 is an enlarged detail view of the head portion of the frame showing particularly the mechanism for locking the frame to the floor during the loading and unloading of the hoisting mechanism.

The particular embodiment of the invention illustrated in Figs. 1 to 11 inclusive comprises a main frame having a base formed of spaced parallel side bars 1 having supporting wheels 2 suitably mounted upon their rear ends and connected together by a girder 3 at such distance from the open rear end of the base as will permit a warp beam or other article to be deposited upon the floor. The front end portions 4 of the side bars 1 desirably converge and are connected by a box-like girder 5 that is shown in Figs. 1, 2 and 11.

Parallel vertical uprights 6 of wide channel form are welded or otherwise secured to the inner faces of the sides of the side girders 1 and to the horizontal girder 5. The upper ends of the uprights are connected together by a top plate and also by a cross girder 7 upon which the sheave for the hoisting cable is mounted.

A vertical channel shaped guide 8 intermediate of the girders 6 is also secured to the girder 5 and to the girder 7 and also to one or more intermediate cross girders, and serves to prevent side swaying of the carriage.

Brackets 9 which preferably are welded to the end portions of the cross girder 5 and to the uprights 6 support a box-like head construction having side plates 10 which are welded to the uprights 6 and are connected at their forward ends by an angle bar 11. Castors 12 having wheels 13 are swiveled upon the head 10 and support the front end of the hoisting machine so that the hoisting machine may be steered in any direction.

The front end of the hoisting machine is provided with a suitable frame which serves to strengthen the rigidity of the uprights and to support the mechanism for actuating the vertically moving carriage. As illustrated, vertical posts 14 are welded to and extend upwardly from the head and are connected by suitable tie bars 15 to the uprights. Angle iron struts 16 extend upwardly and rearwardly from the upper ends of the vertical posts 14 and are connected preferably by welding to the uprights near their upper ends. The vertically movable load supporting means comprises a carriage A having rollers which engage respectively the outer and inner walls of the side flanges of the uprights 6 or tracks which are mounted therein and, in all of the construction illustrated, is provided with a main swinging transporting arm and coordinated supplemental transporting means rotatably mounted on the free end of the main arm, such as a swinging boom B having a depending arm or arms with means for actuating the boom to move the load supported thereby in a horizontal straight line laterally of the vertical plane of the hoisting machine to permit side delivery and loading of the articles carried by the hoisting mechanism.

The mechanism for raising and lowering the carriage comprises a cable 17 which is secured at one end to the carriage A and passes upwardly over a sheave 18 which is mounted upon the cross girder 7 in the usual manner and extends thence downwardly and is connected at its lower end to a winch drum 19 which is mounted upon a shaft 20 and which is driven through suitable gearing and sprocket chain mechanism from an electric motor 21 which is mounted on the head of the machine in the usual manner.

One of the novel features of the invention relates to mechanism for automatically arresting the load supporting means at predetermined upper and lower limits of its movement, together with manually controlled mechanism for accurately arresting the movement of the load supporting means at any desired height intermediate of such upper and lower limits.

This mechanism comprises preferably a chain 22 which is fixedly secured to the upper portion of the carriage A and passes thence upwardly over a sprocket wheel 23, thence downwardly through a tubular slide 24 of rectangular cross section, as shown in Figs. 3 to 7 inclusive, and thence around guide rollers 25 which are mounted upon the lower portion of one of the uprights and is also adjustably connected at its upper end to the carriage A as particularly shown in Fig. 10.

Figure 3:
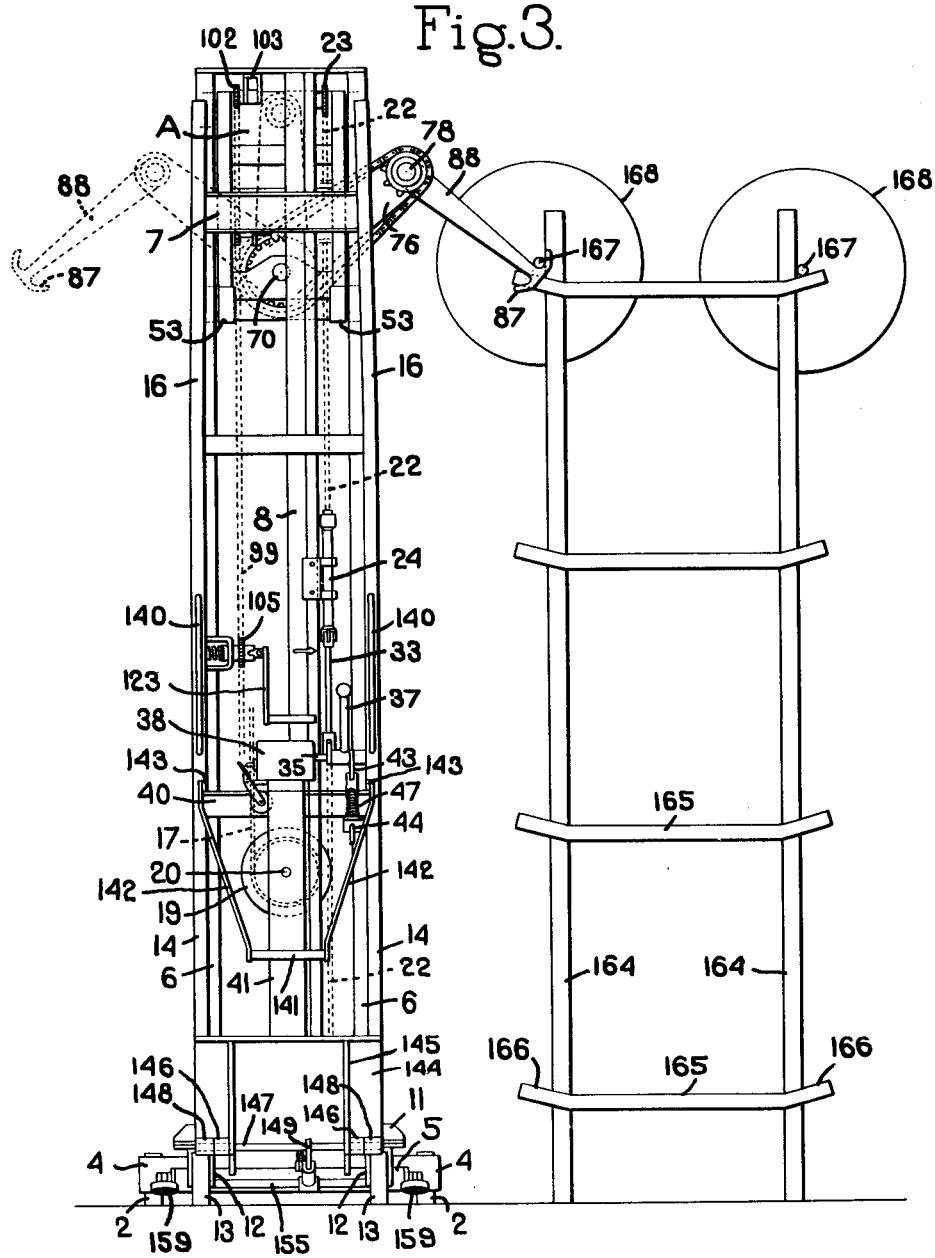
Fig. 3 is a front elevation of the construction shown in Fig. 1 showing also a storage rack for the beams in the manner in which the beam is deposited upon or removed from the storage rack illustrating in dotted lines the position of the beam supporting means when swung in the opposite direction.

The rectangular tubular slide 24 is mounted in rectangular recesses in arms 26 of a bracket 27 which is riveted or otherwise fixedly secured to the vertical channel shaped guide 8 which, as above described, is located intermediate of the uprights 6 (Figs. 3, 4, and 6.)

The rectangular slide has mounted upon each of its ends an internally screw-threaded collar 28 in which is adjustably mounted an externally screw-threaded sleeve 29 having a somewhat enlarged end provided with sockets to receive a spanner wrench for adjusting the sleeve longitudinally of the collar. Desirably, a lock screw 30 is provided for securing the sleeve in adjusted position (Figs. 6 and 7).

The limiting stop chain 22 is provided with members adapted when the chain is moved longitudinally to engage and actuate the slide either upon upward or downward movement of the chain, and thereby move the slide in such a manner as to actuate control mechanism to arrest the movement of the carriage.

In the particular construction illustrated (Fig. 7) the chain is provided with special links, properly located relative to respective ends of the slide, provided with wings 31 adapted to engage the end of the sleeve 29 and thereby move the slide when the carriage approaches a predetermined upper or lower limit of its movement. By reason of the adjustability of the sleeves 29, the upper and lower limits of movement of the carriage can be accurately fixed and also compensation made for wear or stretching of the chain.

The slide 24 has secured to its lower end a laterally projecting arm 32 which is pivotally connected to a link 33, the lower end of which is pivotally connected to an arm 34 of a shaft 35 which is mounted in suitable brackets 36 on the frame. The shaft 35 is fixedly secured to the boss of a control handle 37 adapted to be manipulated by the operator. The shaft 35 extends into a control box 38 containing switch mechanism of a usual character for controlling the direction of rotation of the shaft of the electric motor 21 (Figs. 3, 4, and 6.)

The control box 38 desirably is carried by a supporting plate 39, having reversely bent end portions, which is mounted on a cross girder 40, and is also connected to and supported by a vertical post 41 which is mounted upon the head of the machine and provides a support for the shaft 20 of the winch drum (Figs. 3 and 4).

When the control handle 37 is swung downwardly, for example, to cause the motor to rotate in a direction to wind the hoisting cable upon the winch drum and thereby elevate the load, the limit stop chain will travel downwardly until the wings 31 of the special link engage the sleeve 29 at the upper end of the slide and will move the slide 24 downwardly, thus acting through the link 33 to swing the control handle 37 to neutral position and thereby cause the switch operated by the shaft 35 to interrupt the current supplied to the motor and automatically arrest the upward movement of the carriage.

Similarly, downward movement of the carriage will cause the link of the stop limiting chain to move upwardly until the wings 31 engage the lower sleeve 29 of the slide 24, and by raising the link 33, swing the control handle 37 to neutral position, thereby automatically to stop the load-supporting means at the lower limit of its movement.

In order to enable the operator accurately to arrest the carriage at any desired height intermediate of the upper and lower limits of its movement, a pointer or index 42 is mounted upon the channel shaped guide 8, and a link of chain is provided with suitable indicia, such as a colored painted line, which, as the limiting stop chain travels, will indicate to the operator upon approach to the index the position in which he should manually throw the control handle 37 to neutral position and thereby arrest the movement of the carriage at a predetermined height.

This device is of great importance in that it enables the operator accurately manually to arrest the moving carriage and the load-supporting means mounted thereon at predetermined positions for loading and unloading of the warp beam or other article which is being transported, so that it can be conveniently deposited upon or removed from the storage rack or placed upon or removed from a machine.

The shaft 35 of the controlling mechanism is desirably provided with a downwardly extending arm 43 which is pivotally connected to a rod 44 which is slidably mounted in a boss 45 of a bracket 46 which is mounted on a girder 15 of the frame. A coil spring 47, surrounding the rod 44 abutting at one end against the boss 45 and at the other end against an adjustable nut 48 with a washer interposed therebetween, serves normally to maintain the control handle 37 in neutral position by balancing the weight of the slide 24 and the mechanism carried thereby, so that the usual spring of the controller mechanism will easily restore the reversing switch thereof to neutral position.

The vertically movable carriage A which supports the side delivery mechanism, as illustrated particularly in Figs. 8, 9, and 10, comprises a frame having vertical parallel side bars 49 positioned between and adjacent to the uprights 6 and connected by suitable angle bar cross girders 50 and 51 which are also welded to a backing plate 52. The base of the frame comprises relatively heavy horizontal bars 53 which are welded to the lower ends of the side bars and extend rearwardly therefrom, as shown in Fig. 1.

The frame or carriage is provided with upper and lower pairs of rollers which engage the rear flanges of the channel shaped uprights. The pair of upper rollers 54 which are mounted upon antifriction bearings upon stud shafts 55 extending outwardly from the upper ends of the side frames 49 engage the inner faces of the rear flanges of the channel shaped uprights. The lower pair of rollers 56 are similarly mounted upon stud shafts 57 which extend outwardly from the base bars 53, and they are so positioned as to engage the rear outer faces of the flanges of the channel shaped uprights.

The hoisting cable 17 is provided with a looped lower end 58, the strands of which extend through suitable apertures in the horizontal flange of the cross girder 51 and embrace a block 59 which engages the under face of said horizontal flange (Fig. 10).

It will be noted that the limiting stop chain 22 is connected to a boss 60 which is welded to the cross girder 50 and to the back plate 52, while the other end of the limiting stop chain is adjustably secured to a plate 61 which is welded to the cross girder 51 and to the rear backing plate 52.

Means are provided for preventing side swaying of the carriage during the vertical movement thereof and particularly when the load is swung to one side of the vertical central plane of the hoisting machine. This is accomplished by the provision of the upper and lower rolls which engage the vertical channel shaped guide 8 which is located intermediate of the uprights 6 as heretofore described, and illustrated in Figs. 3, 4, 8 and 10.

In the particular construction shown, the upper guide roll 62 is mounted on antifriction bearings on a stud shaft 63, which, in turn, is mounted in a sleeve 64 welded to an angle plate 65 which, in turn, is welded to the back plate 52 and is also supported by a web or bracket 66 which is mounted upon and welded to a horizontal flange of the cross girder 50 (Fig. 10).

The lower guide roll 67 is similarly mounted upon antifriction bearings on a stud shaft 68 which is anchored in and projects forwardly from a front bearing plate 69 which is welded at its ends to the side bars 49 and to the base bars 53. The rollers 62 and 67, therefore, travel in the vertical channel shaped guide 8 and prevent lateral swaying or binding of the carriage during its vertical movement, irrespective of the position of the weight carried by the boom, thus enabling the carriage to be raised and lowered freely.

The side delivery mechanism comprises a swinging main arm which is pivotally mounted upon the carriage provided at its free end with a bearing in which a boom is rotatably mounted, the boom having one or more supplemental arms having means to support the warp beam or other article to be lifted, the construction being such that the beam or other article will be moved laterally in a straight horizontal line toward and from the vertical longitudinal plane of the hoisting machine when moved in either direction.

The mechanism above described is common to all of the embodiments of the invention illustrated herein and will be first described with respect to the construction shown in Figs. 1 to 11 inclusive.

In the particular construction shown in Figs. 1, 8 and 9 a preferably conical dead spindle 70 is fixedly mounted at one end in the front bearing plate 69 and is similarly mounted in a rear bearing plate 71 which is welded at its ends to the base bars 53. A hollow rotatable shaft 72 is mounted upon ball bearings 73 and 74 upon the respective end portions of the dead spindle, and suitable grease seals 75 are provided at each end of the hollow shaft.

The hollow shaft 72 has rigidly secured to it a preferably tubular main swinging arm 76 rotatable about a horizontal axis. A long tubular bearing member 77 extends through the arm 76 and is welded to it. A boom shaft or spindle 78 is rotatably mounted in antifriction ball bearings 79 and 80 in the bearing member 77 to rotate about a horizontal axis parallel with the axis of rotation of the main arm 76 and is provided with an extension 81 which extends into and is welded to a tubular section 82 of the boom.

In order to provide for adjusting the length of the boom to enable it to lift the warp beams of different length, the tubular beam section 82 has a tubular extension 83 of somewhat smaller diameter in which a shaft 84 is slidably mounted and secured from relative rotation by a key and keyway 85 but which is adapted to permit longitudinal movement therebetween.

The tubular extension 83 of the boom is provided with a rigid radial supplemental arm 86 having a rigid end means, such as re-entrant recesses or a double hook-shaped terminal 87 having re-entrant recesses (see Fig. 3) to engage one end of the shaft of a warp beam or other article to be transported. A similar supplemental arm 88 which is parallel to the arm 86 and of equal length is rigid with the larger tubular section of the boom in proximity to the bearing 80 and is provided with similar double hook-shaped ends to engage the other end of the warp beam shaft or other article to be supported. Either or both of the supplemental arms 86 and 88 may, of course, be provided with other types of article-engaging means designed properly to support the articles to be transported.

Suitable means are provided for locking the shaft 84 in different positions of longitudinal adjustment in accordance with the length of the warp beam. In the particular construction illustrated, the shaft 84 is provided with a series of spaced recesses 89 adapted to be engaged by a lug 90 extending downwardly from a latch 91 which is mounted upon pivots 92 which are mounted in the extension 83 of the boom. A spring 93, which is connected at one end to the latch and at its other end anchored to the boom extension 83, serves selectively to hold the lug 90 of the latch in the particular socket required for the proper lengthwise adjustment of the shaft 84.

One of the main objects of the invention is to provide mechanism operable when the vertically movable carriage is at any desired height for actuating the main swinging transporting arm 76 and simultaneously rotating the supplemental transporting means so that the article which is supported thereby will be moved any desired distance in a straight horizontal lien from or toward the central longitudinal vertical plane of the hoisting machine, thereby providing means for side delivery or side loading of the article and enabling it to be swung into the central vertical longitudinal plane of the hoisting machine for transportation, or when the hoisting machine is moved to its destination to permit the beam or other article to be deposited upon the floor between the side frames or upon a storage rack or upon a machine where the beam is to be used.

The preferred form of mechanism which is illustrated herein for actuating the main swinging arm 76 comprises a worm gear 94 which is fixedly secured to the front end of the tubular shaft 72 to which the arm 76 is rigidly secured. The worm gear 94 engages a worm 95, the shaft 96 of which is mounted in bearings in suitable brackets 97 which are welded to the backing plate 52 of the carriage A. A sprocket 98, which is fixedly secured to the worm shaft 96, is engaged and driven by a sprocket chain 99 which passes over idle sprockets suitably mounted upon the uprights and frame of the hoisting machine and is driven by a crank actuated sprocket mounted upon the frame within convenient reach of the operator, the construction being such that the worm gear and worm can be operated through the chain 99 when the carriage is in any position of elevation.

Desirably a brake 100 (see Fig. 10) engages a drum on the worm shaft 96 and is held in engagement therewith by a spring 101 of such strength as to produce a friction drag on the worm shaft, which will cause the worm and worm gear automatically to lock the swinging arm and boom in any desired position to which it is moved by the actuating mechanism therefor.

In the particular construction illustrated, the chain 99 extends around and engages beneath the sprocket 98, thence extends upwardly over an idle sprocket 102 (Fig. 1), which is carried by a shaft mounted in a bracket 103 depending from the top plate which connects the uprights 6, and extends thence downwardly and forwardly over an idle sprocket 104 to an actuating sprocket 105. The chain 99 engages beneath the actuating sprocket 105 throughout substantially one-half its circumference and extends thence upwardly and rearwardly over an idle sprocket 106, thence downwardly around an idle sprocket 107, which is mounted on the base of the machine, thence upwardly in parallelism with the adjacent upright over an idle sprocket 108, which is mounted upon the carriage A, and thence downwardly beneath the sprocket 98, as aforesaid (Figs. 1, 2, 4, 6, 8, and 10).

In order to maintain the chain under suitable tension, the idle sprocket 106 is so mounted as to act as a takeup. As shown, the stud upon which the sprocket 106 is mounted projects from a triangular plate 109, which is pivoted at one end to a frame member and at its opposite end is connected by a spring 110 which extends upwardly therefrom and is adjustably anchored at its upper end to a bracket 111 which is welded to the upright 6 (Figs. 4 and 6).

Inasmuch as the worm sprocket 98 and the idle sprocket 108 are mounted on the carriage A and moved with it, while the idle guide sprockets 102, 104, 106 and the actuating sprocket 105 are all mounted on the main frame, crank operable mechanism is provided for rotating the actuating sprocket 105, which is normally held out of engagement with the sprocket, so that the chain can move freely during the vertical movements of the carriage without rotating the crank in such manner as to be likely to injure the operator.

As illustrated herein, particularly in Fig. 4, the sprocket 105 has a tubular hub 112 which is rotatably mounted on a shaft 113 which is journaled in a boss 114 of a bracket 115 having a base 116 which is riveted or otherwise fixedly secured to a plate 117 which is mounted upon one of the vertical posts 14 of the upright frame.

The shaft 113 is also journaled in the base 116 of the bracket and the plate 117 and has upon its end a head or collar 118 provided with a pin 119 adapted to engage any one of a circular series of holes in the plate 117, thereby to prevent rotation of the shaft 113 when thus engaged.

A spring 120, which encircles the shaft 113, abuts at one end against the base 116 of the bracket and at its opposite end engages a ball bearing member 121, the opposite side of which engages a rib or collar 122 which is rigid with the shaft 113. The spring 120, therefore, normally tends to force the rib or collar on the shaft into engagement with the end of the boss 114 of the bracket. A crank 123, which is fixedly secured to the shaft 113, is provided with a handle 124 adapted to be engaged by the operator. A pin 125 is mounted in the shaft 113 in proximity to the crank 123 and is adapted, when the crank and shaft are forced longitudinally to the dotted line position indicated in Fig. 4, to engage in a recess or diametrically opposite recesses 126 in the end of the hub of the sprocket 105.

In order to rotate the chain actuating sprocket 105 and thereby actuate the chain 99 to swing the main arm and the boom carried thereby, it is necessary for the operator to force the shaft 113 longitudinally until the pin 125 engages the slot or slots 126. Such longitudinal movement of the shaft will withdraw the pin 119 from the hole in the plate 117 so that the shaft 113 can be rotated by the crank. The rotation of the crank handle will rotate sprocket 105 to swing the beam to a desired position. By reason of the presence of the worm gear and the brake for the worm gear shaft heretofore described, the swinging arm and beam will be automatically locked against reverse movement. When the main swinging arm and boom are thus positioned and the crank handle released, the spring 120 will force the shaft 113 longitudinally and thereby disengage the pin 125 from the sockets 126 in the hub of the chain actuating sprocket, so that the chain actuating sprocket may rotate freely as the lead of the chain which engages it travels up or down when the carriage is raised or lowered.

In order to rotate the boom simultaneously with the swinging of the main arm 76 to move the load in a straight horizontal line, the effective length of the boom arm or arms 86 and/or 88 should be equal to the radial distance between the axis of the dead spindle 70 and the axis of the boom, and suitable means provided for simultaneously rotating the boom at a predetermined rate in synchronism with the swinging movement of the main arm 76.

A preferred mechanism for accomplishing this purpose, which is illustrated in Figs. 1, 3 and 8, comprises a sprocket wheel 127, the hub of which is fixedly secured to the shaft or spindle 78 of the boom. A sprocket chain 128 which engages the sprocket 127 is fixedly secured at its lower end to the base frame of the carriage A and provided with suitable guiding mechanism for the anchored ends of the chain which will enable it properly to rock the boom in synchronism with the side movement of the main arm 76.

In the particular construction illustrated (Figs. 8 and 9), the ends of the sprocket chain 128 are provided with reversely threaded fittings 129 which engage complementary reversely pitched screw threads in the ends of the nut 130 having a central cylindrically recessed portion which is mounted in a U-shaped strap 131, the ends of which are fixedly secured to a block 132 which is welded to a sleeve 133 which surrounds the central portion of the tubular shaft 72. One end of the sleeve 133 extends into a complementary aperture in the back wall 52 of the carriage and is welded thereto, and the other end of the sleeve extends into and is welded to a rigid web 134, which in turn is welded to a plate 135 and to the base bars 53. By reason of the simultaneous and equal adjustment of both ends of the sprocket chain when the nut 130 is rotated, the chain may be lengthened or shortened without rotating the sprocket 127, which otherwise would vary the relative positions of the main and supplemental arms.

A preferred form of guiding mechanism for the sprocket chain 128 comprises a cylindrical disk 136, having a recessed lower face to engage the block 132 and nut 130, and is welded to the sleeve 133 and its periphery forms a guide for the lower end portions of the chain 128.

When, therefore, the main arm 76 is swung laterally, the chain 128 will rotate the sprocket 127 which is fixedly secured to the rotatable boom and thereby swing the load supporting arms 86 and 88 in the same direction as the direction of movement of the main arm 76, thereby moving the arms 86 and 88 to and from the vertical plane of the hoisting machine so that the shaft of the warp beam will be moved in a straight horizontal line. In order properly to adjust the tension upon the chain 128, the nut 130 may be rotated by a spanner wrench or other suitable means.

In order to compensate for the weight of the boom a spiral spring 137 is connected at one end to a block 138 which is welded to the main swinging arm 76 and to the tubular bearing 77 for the boom spindle, and is connected at its other end to a lug 139 projecting from the rear bearing plate 71 of the carriage.

Inasmuch as the hoisting machine for warp beams and the like above described is intended to transport the warp beams or other articles to and from storage racks and to and from machines upon which they are to be used, and are required to pass through narrow aisles, suitable means are provided for pushing or pulling the hoisting machine.

In the construction illustrated, the means for pushing the hoisting machine comprises U-shaped push bars 140, the ends of which are fixedly secured to the vertical posts 14, as shown in Figs. 1 and 3.

The means for pulling the hoisting machine illustrated comprises a pull handle 141 (see Figs. 1 and 3) pivotally mounted at one end of converging straps 142, the rear ends of which are pivotally mounted upon ears 143 welded to the post 14.

In order to maintain the hoisting machine in fixed position, during loading and unloading, means are provided for locking the hoisting machine to the floor. A preferred form of locking mechanism which is illustrated in Figs. 1, 3 and 11 comprises a platform 144 having reinforcing ribs 145 which are provided with bosses 146 fixedly secured to a shaft 147 which is pivotally mounted in brackets 148 which are welded to the transverse angle bar 11 of the frame. The shaft 147 has welded to it an arm 149 which is pivotally connected to a coupling 150 upon the end of a rod 151 which telescopically fits within and is adjustably secured to a tubular member 152 provided with a coupling member 153 which is pivotally connected to an arm 154 which is welded to a shaft 155 which is journaled in brackets 156 mounted on the transverse box-shaped girder 5. The shaft 155, which preferably extends beyond the sides of the hoisting machine has welded to its ends parallel arms 157 which are pivotally connected to webs 158 of floor engaging blocks 159 provided with suitable surfaces firmly to engage the floor when the blocks are depressed upon it.

A rod 160 which is slidably mounted in a bracket 161 welded to one of the brackets 9 of the head frame of the machine is provided with a coupling head 162 which is pivotally mounted upon the pivotal shaft which connects the arms 149 of the shaft 147 to the coupling 150 of the rod 151. A spring 163 which is interposed between the bracket 161 and head 162 of the rod 160 normally forces the rod 160 forwardly, thereby causing the arms 149 of the shaft 147 to maintain the platform in upright position, as illustrated in Figs. 1 and 11.

When the hoisting machine has been transported to loading or unloading position, the operator depresses the platform with his foot and then stands upon it to control the hoisting of the carriage, and when the carriage is properly positioned to actuate the crank which operates the side delivery mechanism.

The relative position of the hoisting machine and the rack-supporting warp beams is shown in Fig. 3 with the side delivery mechanism in position to engage the shaft of a warp beam. As shown, the rack comprises suitably spaced vertical posts 164 to which are welded cross girders 165 having upwardly inclined end portions 166 providing angular sockets to receive the shafts 167 of a plurality of warp beams 168 stored thereon.

The side delivery mechanism is illustrated in full line, as engaging the shaft 167 of one of the warp beams, and is illustrated in dotted lines as extending from the opposite side to indicate that side delivery of the warp beam or other article may be made in either direction.

If the effective length of the arms 86 and 88 of the boom is equal to the distance between the axis of the shaft 70 of the main swinging arm and the axis of the boom, the shaft of the warp beam will be moved in a straight horizontal line toward and from the axis of the shaft 70, when the ratio of the pitch diameter of the chain guide 136 to the pitch diameter of the sprocket 127 is two to one. The operator, therefore, can accurately control the carriage by observation of the registry of the markings on the limit stop chain with the index 42 on the upright to position the load receiving end of the arms 86 and 88 just beneath the shaft of the warp beam which is supported in the storage rack before swinging the arms to engaging position. Thereupon, the carriage may be raised a short distance and the main swinging arm and boom actuated to carry the warp beam horizontally into the longitudinal plane of the hoisting machine for transportation. Similarly, the operator can accurately position the carriage so that the shaft 167 of the warp beam may be positioned slightly above the sockets in the rack before the side delivery mechanism is swung to position to deliver the beam to the rack and the carriage thereupon lowered to deposit the beam upon the rack.

In order to prevent sudden jerking of the hoisting cable 17 due to the slackening of the cable by accidental obstruction in the path of the descending carriage and sudden release from said obstruction, cable controlled means are provided which are operated by the slackening of the cable to stop the motor which actuates the hoisting mechanism.

A preferred construction which is illustrated in Fig. 4 comprises a cable engaging roller 169 preferably of heavy weight, the shaft of which is mounted upon arms 170 which are mounted upon a shaft 171 carried by bracket 172 which is welded to the post 41 and to the under side of the control box 38. The position of the shaft 171 is such that the arm 170 extends downwardly at a substantial angle to the vertical and causes the roller 169 forcibly to engage the hoisting cable 17. While ordinarily the weight of the roller is sufficient, the force with which the roller engages the cable 17 may be increased by a coil spring 173 encircling the shaft 171 and secured at one end to the arm 170 and at its opposite end to the bracket 172 or some other stationary member.

The arm 170 is provided with an extension 174 adapted when the roller 169 swings laterally to the left, Fig. 4, to engage the end of a plunger 175 which is slidably mounted in a suitable bearing in the side of the control box 38, and adapted, when forced inwardly, to engage an arm 176 of suitable switch mechanism, and actuate the same to break the circuit leading to the electric motor and thereby arrest the motor before the cable has slackened sufficiently to cause it to be broken or injured if the carriage is released from the obstruction which it has encountered.

Various modifications of the construction shown in Figs. 1 to 11 inclusive and heretofore described may be made as illustrated, for example, in Figs. 12 to 21 of the drawings. In the construction illustrated particularly in Figs. 1 and 3 the article-supporting means on the ends of the supplemental arms 86 and 88 are in the form of double hook-shaped terminals adapted to engage the shaft of a warp beam. A simplified construction is illustrated in Fig. 12 in which the ends of each of the supplemental arms are provided with V-shaped inwardly extending flanges 177 adapted to form sockets to receive the shaft of the warp beam.

In the construction illustrated in Figs. 1, 3, and 12, the main swinging arm 76 extends upwardly from the shaft upon which it is rotatably mounted and the supplemental arms 86 and 88 extend downwardly from the boom which is rotatably mounted in the free end of the main arm. However, the main arm 76 may alternatively be extended downwardly and the supplemental arms 86 and 88 may extend upwardly, as illustrated in Fig. 16, and in this construction the ends of the supplemental arms may be provided with reentrant recesses and preferably provided with flanges 178 which extend toward each other and the shaft of the warp beam supported within the reentrant recesses in the manner shown in Fig. 16.

Other modifications of the invention are illustrated in Figs. 13 and 14, and in Figs. 15, 17, and 18, in which a supplemental arm or arms is or are provided with load supporting members which are pivotally mounted upon the end thereof and maintained in horizontal position and moved in a horizontal line throughout the swinging movements of the main and supplemental arms. In the construction graphically illustrated in Fig. 13 the load-engaging members are in the form of horizontal, preferably rectangular, blocks 179 which are rigidly connected respectively to shafts 180 which are mounted respectively in ball bearings 181 in bosses in the ends of the arms 86 and 88. The blocks 179 are provided with downwardly extending recesses on horizontally opposite sides of the shaft 180 and either is adapted to receive and support the shaft of the warp beam.

In order to maintain the blocks 179 in horizontal position during the swinging movements of the main arm 76 and the supplemental arms 86 and 88, the shaft 180 has secured to it a sprocket wheel 183 which is engaged by a sprocket chain 184 which engages a complementary sprocket 185 which is fixedly secured to the main swinging arm 76. The boom spindle 78 is rigidly secured to the main swinging arm 76 and the supplemental swinging arms 86 and 88 are integral with a cylindrical boom which is mounted upon the boom spindle 78, as illustrated in Fig. 17. The sprocket 127 is fixedly secured to the cylindrical boom and is actuated by the chain 128 when the main swinging arm 76 is swung laterally in either direction.

Where the effective length of the main swinging arm 76 and the supplemental arms 86 and 88 are the same and the pitch diameter of the sprockets 127 and 185 are respectively one-half the pitch diameters of the chain guiding disk 136 and sprocket 183 the shafts 180 will be moved in a straight horizontal line and the blocks 179 will be retained horizontally level during the entire swinging motion of the main and supplemental arms.

While a strictly horizontal movement of the article supporting means will be produced by the mechanism above described, in which the main and supplemental arms are of equal length, and in which the sprockets have a 2 to 1 ratio, a substantially horizontal movement of the article supporting means which closely approximates a strictly horizontal line may also be produced by supplemental arms having a different length than that of the main arm by the employment of suitable power transmitting mechanism such as chain and sprocket mechanism in which complementary sprockets having suitable different pitch diameters are employed.

The successive relative angular positions of the main and supplemental arms and the positions of the load supporting means are graphically illustrated in Figs. 22, 23 and 24. Fig. 22 illustrates the position of the main arm 76 and supplemental arm 88 having a radial length equal to that of the main arm plotted at various positions of their coordinated angular swinging movements produced by gearing in which the ratio of the sprocket 136 and the sprocket 127 is 2 to 1 and clearly shows that the path of the article supporting means 87 (Fig. 1), and/or 197 Fig. 6, and 252 Fig. 19, and elsewhere, moves in a strictly horizontal path.

Fig. 23, which is similarly plotted, shows various coordinated angular positions of the main arm 76a and the supplemental arm 88a where the lengths of the main arm 76a and supplemental arm 88a are in the ratio of 5 to 4 and the ratio of the sprocket 136a and the sprocket 127a is 2.129 to 1 which demonstrates that the path of the article supporting means 87, etc., very closely approximates a horizontal line.

Fig. 24, which is similarly plotted, shows various coordinated angular positions of the main arm 76b and the supplemental arm 88b where the lengths of the main arm 76 and supplemental arm 88b are in the ratio of 2 to 1 and the ratio of the sprocket 136b and the sprocket 127b is 2.465 to 1 which demonstrates that the path of the article supporting means 87, etc., very closely approximates a horizontal line.

An adaptation of the construction shown in Fig. 13, in which the supplemental arms support a horizontal platform instead of article-supporting blocks, is illustrated in Figs. 15 and 17.

In the construction shown in Figs. 15 and 17 the dead spindle 70, on which the hollow rotatable shaft 72 of the main swinging arm is mounted, is the same as shown in Figs. 8 and 9, as is also the stationary non-rotatable chain-guiding disk having a flat recessed lower face which engages the block 130 which is rigidly secured to the plate 135 which in turn is welded to the base bars 53 of the carriage. The sprocket chain 128 is similarly provided with reversely threaded fittings which engage complementary pitched screw threads in the ends of a nut 130 having a cylindrical recessed portion which is mounted in the U-shaped strap 131 the ends of which are fixedly secured to a block 132 which is welded to the sleeve 133 which surrounds the tubular shaft 72, as illustrated in Figs. 8 and 9. In this construction also the tubular main swinging arm 76 is welded to the hollow rotatable shaft 72 which forms the journal for the swinging arm and the rotatable hollow shaft 72 is actuated to swing the arm 76 through the worm gearing, chain, and manually operable crank mechanism, shown in Figs. 1, 3, 4, 6, 8, and 10, above described.

The mechanism shown in Figs. 15 and 17 differs from the construction shown in said Figs. 1, 3, 4, 6, 8, and 10, in that the arm 76 is provided with a longitudinally extending bracket 186, and the boom spindle 78 instead of being rotatable is fixedly secured to the bracket by a pin 187 and preferably also by welding, and in that the boom is in the form of a cylindrical sleeve which is concentrically mounted upon the boom spindle 78 and is provided with supplemental swinging arms corresponding to the supplemental swinging article-supporting arms heretofore described.

As illustrated in Figs. 15 and 17 a cylindrical bearing member 188 extends through a complementary aperture in the end portion of the main swinging arm 76' and is welded thereto. The cylindrical boom 189 is rotatably mounted in widely spaced antifriction bearings 190 within and adjacent the ends of the bearing member 188. The cylindrical bearing 188 has an integral head 191 which forms a shoulder for the adjacent antifriction bearing 190. The tubular hub 192 of a sprocket 193 is keyed to the preferably reduced end portion of the cylindrical boom 189.

Parallel supplemental swinging arms 194 and 195, similar to the supplemental arms 86 and 88, are welded to the cylindrical boom 189 and desirably are of the same effective radial length as that of the main swinging arm 76.

The free ends of the arms 194 and 195 are provided with bosses each of which contains an antifriction bearing 196 in which a shaft 197 is mounted which supports the article-carrying means.

In this construction the article-supporting means is in the form of a platform having a base 198 which desirably is welded to the vertical strengthening plate or angle bar 199 and the platform base and plate 199 are welded to end brackets 200 which are provided with bosses 201 through which the shaft 197 extends. The bosses 201 are welded to the shaft 197 and end girders 202 extend outwardly therefrom to support the base 198 of the platform. A suitable number of supplemental girders 203 intermediate of the end girders 202 are welded to the shaft 197 and desirably extend the full length of the platform.

The platform is maintained in horizontal position during the swinging movement of the main arm 76 and supplemental arms 194 and 195 by a suitable means, such as sprocket and chain mechanism. As illustrated a sprocket 204 having an integral tubular hub provided with a flange 205 is rigidly secured to the thickened end portion 206 of the tubular bearing member 188, and a chain 207, which engages the sprocket 204, extends around and engages a complementary sprocket 208 which is welded or otherwise fixedly secured to the shaft 197. The sprocket 208 is twice the diameter of the sprocket 204.

Preferably another sprocket 209 is fixedly secured to the end of the non-rotatable dead boom spindle 78 and likewise is engaged by a chain 210 which in turn engages a sprocket gear 211 on the opposite end of the shaft 197. The pitch diameter of the sprocket 211 has the same pitch diameter ratio of that of the sprocket 209 as the pitch diameter ratio of the sprocket 208 to that of the sprocket 204. Preferably the supplemental arms 194 and 195 are of equal length and the ratio of pitch diameter of the gears 211 and 208 to the gears 209 and 204 respectively are two to one.

The operation of the device is similar to that heretofore described in respect to Figs. 1, 3, 4, 6, 8, 9, and 10. The arm 76 is actuated by the same mechanism as described in respect to said figures. The lateral swinging movement of the arm 76 causes the chain 128 to rotate the sprocket 193 which is secured to the cylindrical boom 189 and thereby swing the supplemental arms of the boom laterally in the same direction as the direction of movement of the main arm 76. The sprockets 204 and 209 which being attached respectively to the bearing sleeve, which is welded to the arm 76 and to the end of the dead spindle 78, causes the chains 207 and 209 to rotate the shaft 197 in such manner as to maintain the platform 198 level in the horizontal plane and to cause it to move in a straight horizontal line throughout the lateral swinging movements of the main and supplemental arms.

Another embodiment of the invention is illustrated in Fig. 18, which differs from the construction previously described, in that the mechanism for swinging the main and supplemental arms is more compact and in that a single supplemental swinging arm is provided instead of parallel supplemental swinging arms such as heretofore described. In this construction the carriage A, which is mounted upon and vertically movable upon the uprights 6 of the hoisting machine, is identical with that heretofore described and is identified by the same numerals and need not be further described (see Figs. 8, 9, and 10). In this construction the dead spindle 70, on which the rotatable shaft 72 of the main swinging arm is mounted upon antifriction bearings 73 and 74, is fixedly secured to the front bearing plate 69 and the opposite end of the dead spindle is provided with a cylindrical end portion 212 which extends into and is welded to a cylindrical plate 213 which corresponds to the cylindrical disk 136 which forms a guide for the chain 128 (instead of being fixedly mounted in the rear bearing plate 71, as shown in Figs. 8 and 9). The plate 213 is fixedly secured to the carriage A by welding, or otherwise, and its cylindrical periphery forms a guide for the sprocket chain 128 in the manner heretofore described. The ends of the chain 128 are connected by suitable fittings to the rotatable nut 130 which is mounted in the U-shaped strap 131 which is fixedly secured to the block 132 which in turn is welded to the plate 213, and the main swinging arm 76 is actuated by the same mechanism as that heretofore described with respect to the construction shown in Figs. 1 to 10.

A hollow cylindrical boom 216 is mounted on ball bearings 217, the outer races of which are secured in enlarged end portions of the boom 216 and the inner races of the bearings are mounted upon the non-rotatable boom spindle 215.

In this construction a single supplemental swinging arm 218 preferably of heavier construction than those heretofore described is welded at its upper end to the boom. The lower end of the supplemental swinging arm 218 is welded to a cylindrical bearing member 219 which is provided with antifriction bearings 220 in which the tapered end portion 221 of a rotatable shaft 222 is mounted. The inner end of the shaft 222 is provided with a nut 223 which abuts against the inner race of the bearing 220. The shaft 222 is provided at the end of the tapered portion 221 with an enlarged portion 224 and a relatively large flange 225 is formed integral with or welded to the enlarged portion 224 of the shaft. The cylindrical hub 226 of a sprocket 227 is welded to the flange 225. The sprocket 227 is engaged by a chain 228 which extends around and engages a sprocket 229 which is keyed upon the reduced end of the non-rotatable boom spindle 215.

A suitable load supporting means such as a platform 230 is mounted upon brackets 231 and 232 which are welded to the shaft 222. The platform construction desirably is in all respects similar to that illustrated in Figs. 15 and 17.

The rotatable boom 216 is provided with a sprocket 233 which is engaged by the chain 128 which is guided by the cylindrical periphery 214 of the chain guiding disk 213 during the swinging movement of the main arm 76.

In the operation of the machine swinging movement is imparted to the main arm 76 in the manner heretofore described and by the same mechanism as illustrated and described in respect to the construction shown in Figs. 1, 3, 4, 6, 8, 9, and 10.

During the swinging movement of the main arm 76 the cylindrical boom 216 is rotated in the same direction of movement by the chain 128, thereby swinging the supplemental arm 218 in the same direction as the direction of movement of the main arm 76. The sprocket 229 acting through the chain 228 thereupon rotates the sprocket 227 in the reverse direction and inasmuch as the shaft 222, which supports the platform 230, is fixedly secured to the sprocket 227 the platform is moved in a horizontal straight line or plane and its surface maintained horizontal throughout such movement.

Another modified form of the invention is illustrated in Figs. 19 and 20. This construction may be and substantially is identical with the construction shown in Figs. 1, 3, 4, 6, 8, 9, and 10, so far as the mechanism for actuating the main swinging arm 76 and the spindle 78 which is rotatably mounted in the bearing member 77 is concerned and need not therefore be illustrated.

In this construction the boom spindle 78 is provided with a cylindrical extension 234 which corresponds to the cylindrical extension 82 shown in Fig. 8 and supplemental arms 235 and 236 (which correspond to the supplemental arms 86 and 88 Fig. 8) are provided with cylindrical hubs 237 and 238 which are slidably mounted upon the cylindrical boom and secured thereon against rotation by keys extending into key slots 239 and 240 respectively. The cylindrical boom has welded to it brackets 241 and 242 which extend in parallelism respectively with the supplemental arms 235 and 236. These brackets are provided respectively with antifriction bearings 243 in which is mounted a rotatable shaft 244 provided with reversely arranged screw threaded sections 245 and 246 which extend through and engage complementary screw threads in bosses 247 and 248 in the supplemental arms 235 and 236 respectively.

Suitable means are provided for rotating the shaft 244 to slide the cylindrical hubs 237 and 238 and consequently the supplemental arms 235 and 236 toward or from each other and the supplemental arms are provided adjacent their free ends with means to engage the respective ends of a tubular shaft of a beam or roll which is to be transported.

In the preferred construction illustrated the ends of the supplemental arms 235 are provided with bosses 249 in which are mounted ball bearings 250 and the means for entering and engaging the hollow shaft of the roll to be transported are mounted in these bearings. As illustrated each shaft-engaging means comprises a bolt 251 having a cylindrical head 252 adapted to enter the end of the hollow shaft 253 of the roll 254.

A relatively large washer or flange 255 is adapted to engage the end of the hollow shaft, the washer or flange 255 being of such size that it will not enter the hollow shaft 253. A spacing sleeve 256, which is integral with the washer 255, extends through the bearing 250 and is clamped upon the inner race of the bearing by a nut and washer.

Any suitable means may be provided for rotating the shaft 244 to cause the screw threaded portions thereof to move the supplemental arms toward each other in such manner that the members 252 may enter the ends of the hollow shaft 253, where the roll is to be raised, and to produce reverse movement of the supplemental arms to release the roll shaft when it has been moved to its destination. In the preferred construction illustrated herein a cylindrical sleeve 257 is rotatably mounted upon antifriction bearings 258 intermediate of the bearing member 77 on the main arm 76 and the bracket 242 on the boom 234. The sleeve 257 is provided with a reduced end section 259 upon which is mounted a spur gear 260 which meshes with a complementary pinion 261 which is fixedly secured to the shaft 244. The sleeve extension 259 is also provided with a sprocket 262 which is engaged by a sprocket chain 263 which is driven by a sprocket 264 upon a shaft 265 of a reversible electric motor 266 which can be conveniently mounted in a suitable recess in the main swinging arm 76.

In the operation of the construction illustrated in Figs. 19 and 20, the main and supplemental arms are actuated in the same manner as in the construction illustrated in Figs. 1, 3, 4, 6, 8, 9, and 10 until the supplemental swinging arms 235 and 236 are positioned in alinement with the ends 253 of the roll 254 to be transported. Current is thereupon supplied to the reversible electric motor 266 thus driving the sprocket 264, the sprocket chain 263, a sprocket 262, thereby rotating the sleeve 257 and causing the gears 260 and 261 to rotate the shaft 244, so that the screw threaded portions 245 and 246 thereof will cause the supplemental arms 235 and 236 to move toward each other, thus entering the article-lifting means 252 into the ends of the shaft, and upon further movement causing the flanges 255 to slide the roll lengthwise if necessary until it is properly centered between the supplemental arms 235 and 236. The main carriage may then be raised to transport the load to its destination the main and supplemental arms then swung in the same direction in the manner aforesaid to position the roll properly upon a rack or machine, whereupon the direction of rotation of the motor may be reversed to separate the supplemental arms 235 and 236 and thereby release the members 252 from the ends of the roll shaft.

A further embodiment of the invention for handling long heavy rolls or the like is illustrated in Fig. 21 in which the hoisting machine is provided with a long base frame having uprights at each end thereof with identical carriages slidably mounted upon the uprights and having swinging complementary means and supplemental arms simultaneously moved laterally in the same direction and adapted to move the article supported thereby therebetween in a horizontal line or plane. In this construction the wheel-supported base 1, the upright 6, the reenforcing frame comprising the posts 14, the struts 16, the vertically movable carriage which is mounted upon the uprights 6, as shown at the right hand end of Fig. 21, may be and desirably is the same as that illustrated in Figs. 1 and 3 of the drawings, and the carriage A may be raised and lowered in a similar manner by a cable 17 which is secured to the carriage and passes over the sheave 18, thence downwardly to a motor driven winch mechanism, such as illustrated in Fig. 1, and which therefore is omitted from Fig. 21. In the construction shown in Fig. 21, similar uprights 6 and framing are mounted upon the rear end portion of the base of the hoisting machine. A similar carriage A' is also mounted upon the rear uprights 6 and is raised and lowered by a cable 17 which may be actuated through suitable gearing from the same winch which raises and lowers the carriage A by providing suitable guiding sheaves in a manner which will be readily apparent to one skilled in the art, the construction being such that both the carriages A and A' will be simultaneously raised and lowered in unison.

The swinging arms 76 may be similarly journaled in each carriage and provided with bearing members 77 for the bearing spindles for the boom, as is illustrated particularly in Fig. 8. In this construction the respective supplemental swinging arms 86 and 88 are fixedly secured to the ends of the boom spindles 78 and are of equal effective radial length to the radial length of the arms 76.

In the construction shown in Fig. 21 the hollow journal for each swinging arm 76 is provided which corresponds in all respects to the journal 72 of the construction illustrated in Fig. 8 and is provided with a worm gear 94 adapted to be actuated by a suitable worm.

In order to synchronise the swinging movements of the arms 76 which are mounted on the respective carriages A and A' different mechanism is employed for rotating the worms which engage the worm gears which actuate the main swinging arms 76 and the mechanisms carried thereby. The preferred form of mechanism which is illustrated in Fig. 21 comprises worms 267, which engage the respective worm gears 94, which are mounted in suitable bearings in brackets 268 rigid with the carriages A and A'. Each of the worms is provided with an axial angular, preferably square, bore. Complementary angular, preferably square, vertical shafts 269 are slidably mounted in the angular bores of the worms 267 and are connected at their lower ends by universal joints 270 to beveled gears 271 upon a shaft 272 which extends lengthwise of the base, and is provided at its front end with a sprocket 273 adapted to be driven through suitable gearing which may be actuated by any suitable manually operable or manually controlled mechanism as will be readily understood by those skilled in the art.

By reason of this construction the swinging main arms 76 and the supplemental arms 86 and 88 may be actuated simultaneously when the carriages are at any desired uniform elevation.

In order to enable a roll having a hollow shaft, as illustrated, or other article to be lifted, the free ends of the supplemental arms are provided with means adapted to be extended or retracted to enter the ends of the hollow shaft. A convenient form of mechanism which is illustrated in Fig. 21 comprises a slide in the form of a disk or plate 274 having a plurality of rods or bars 275 slidably journaled in bosses 276 integral with the ends of the arms 86 and 88 respectively. The plates 274 are each provided with an integral, preferably cylindrical, block 277 adapted to enter the end of the hollow shaft, the plate 274 being of such diameter that it cannot be introduced into the hollow shaft.

Any suitable means may be provided for moving the shaft-engaging slides outwardly and inwardly with respect to the bosses 276 on the arms 86 and 88 respectively. A convenient construction which is illustrated herein comprises a screw threaded shaft 278 which is swiveled in the plate 274 and extends through the bosses 276 and engages internal screw threads therein, the screw threaded shafts being simultaneously rotated by small synchronised motors 279 which are mounted upon the respective end portions of the supplemental arms 86 and 88.

It will be apparent from the foregoing description that the construction illustrated in Fig. 21 comprises in all essential particulars a duplication of the uprights and frame mechanism heretofore described as being mounted on the front end of the frame by similar uprights and frame mechanism at the rear end of the frame; that the vertical carriages which are mounted upon the front and rear pairs of uprights are the same and operated by the same winch mechanism or if desired by synchronised separate winch mechanisms.

The main swinging arms 76 are mounted on the respective carriages in the same manner and can be actuated simultaneously by the same mechanisms as are employed to actuate them in the manner heretofore described.

Substantially the same mechanisms can be employed for limiting the upward and downward movements of the respective carriages and for arresting the carriages at any desired elevations.

The particular mechanism illustrated in Fig. 21 for rotating the worms 267 for swinging the main arms 76 is in all respects the mechanical equivalent of the construction previously described, except that the worms 267 are positioned vertically and mounted in brackets in the carriage and slidably mounted on rods 269 of angular cross section instead of being mounted horizontally and actuated by an endless sprocket chain operated by a crank.

In the construction illustrated in Fig. 21 the slidable connection between the rods 269 and the worms 267 permits actuation of the main swinging arms in unison when the carriage is at any position of elevation. Inasmuch as the lower ends of the rods 269 are geared to the horizontal shaft 272 they may be simultaneously rotated in any suitable manner as, for example, by a crank 280 which is fixedly secured to a shaft 281 journaled in suitable brackets 282 and 283 upon the posts 14 and uprights 16 with a sprocket wheel 284 which is mounted upon the shaft 281 actuating a sprocket chain 285 which in turn actuates the sprocket 273 to rotate the shafts 269 in unison. Obviously a separate manually controlled reversing motor might be employed for actuating the shaft 272 instead of the manually operable crank mechanism above described.

It will be apparent from the above description and the various embodiments of the invention illustrated and described herein that the invention may be applied to various forms of mechanism and it will therefore be understood that the embodiments of the invention herein shown and described are of an illustrative character and not restrictive of the meaning and scope of the following claims.

Having thus described the invention, what is claimed as new, and desired to be secured by Letters Patent, is:

1. A portable hoisting machine comprising a vertically movable carriage, a main transporting arm mounted on said carriage to swing laterally about a horizontal axis, rigid supplemental transporting means mounted on the free end of said main transporting arm to swing about a parallel horizontal axis and provided with article-supporting means, and means operable by the swinging movement of the main arm to swing the supplemental transporting means in the same direction and to correlate the ratio of the angular movements of the main arm and the supplemental transporting means to the ratio of the effective radial lengths of the main arm and supplemental transporting means to move the article-supporting means horizontally in a straight line throughout the entire swinging movements of the main arm and supplemental transporting means.

2. A portable hoisting machine comprising a vertically movable carriage, a main transporting arm mounted on said carriage to swing laterally about a horizontal axis, rigid supplemental transporting means rotatably mounted on the free end of said main transporting arm to swing about a parallel horizontal axis and provided with article-supporting means having the same effective radius of movement as that of the main arm, and means operable by the swinging movement of the main arm to swing the supplemental transporting means in the same direction including means for correlating the swinging movement of the supplemental arm to that of the main arm to move the article-supporting means horizontally in a straight line throughout the entire swinging movements of the main arm and the supplemental transporting means.

3. A portable hoisting machine comprising a vertically movable carriage, a main transporting arm mounted on said carriage to swing laterally about a horizontal axis, rigid supplemental transporting means rotatably mounted on the free end of said main transporting arm to swing about a parallel horizontal axis and provided with article-supporting means having the same effective radius of movement as that of the main arm, and means operable by the swinging movement of the main arm to swing the supplemental transporting means in the same direction including means for correlating the swinging movement of the supplemental arm to that of the main arm to move the article-supporting means horizontally in a straight line throughout the entire swinging movements of the main arm and the supplemental transporting means, and means operable by the swinging movement of the main arm and the supplemental transporting means to maintain the article-supporting means in a horizontal position throughout the entire swinging movements of said main arm and said supplemental transporting means.

4. A portable hoisting machine comprising a wheel-supported base, uprights mounted thereon, a carriage mounted on said uprights, means for raising and lowering said carriage, a main arm journaled in said carriage, a boom rotatably mounted on the end portion of said main arm extending over and lengthwise of said base, supplemental spaced arms rigid with said boom having means to support the article to be lifted, means for simultaneously swinging said main and supplemental arms laterally in the same direction including means for correlating the ratio of the angular movement of the main arm and the supplemental transporting means to the ratio of the effective radial lengths of the main arm and supplemental transporting means to move the article-supporting means horizontally in a straight line throughout the entire swinging movements of the main arm and supplemental transporting means, to move the article supported by said supplemental arms over said base or beyond the side thereof in a substantially horizontal straight line.

5. A portable hoisting machine comprising a wheel-supported base, uprights mounted thereon, a carriage mounted on said uprights, means for raising and lowering said carriage, a main arm journaled on said carriage to swing laterally, a boom rotatably mounted on the end portion of said main arm extending over and lengthwise of said base and formed of longitudinally adjustable sections, supplemental arms rigid with the respective boom sections having means to engage and support the article to be lifted, means for locking the boom sections in adjusted position, and means for simultaneously swinging said main and supplemental arms laterally in the same direction to move the article supported by the supplemental arms over said base or beyond the side thereof.

6. A portable hoisting machine comprising a wheel-supported base, uprights mounted thereon, a carriage mounted on said uprights, means for raising and lowering said carriage, a main arm journaled on said carriage to swing laterally, a boom rotatably mounted on the end portion of said main arm extending over and lengthwise of said base, suitably spaced supplemental arms rigid with said boom having means to support the article to be lifted having the same effective radius of movement as that of the main arm, means for swinging said main arm laterally, and means simultaneously operated to rotate said boom so correlated to the swinging movement of the main arm as to cause the supplemental arms to swing the article-engaging means in the same direction as the direction of the swinging movement of said main arm and thereby to move the article-supporting means horizontally in a straight line over the base or beyond the side thereof.

7. A portable hoisting machine comprising a wheel-supported base, a frame having uprights mounted thereon, a carriage mounted on said uprights, means for raising and lowering said carriage, a main arm journaled on said carriage to swing laterally, supplemental rigid transporting means rotatably mounted on said main arm having the same effective radial length as said main arm and provided with means to support the article to be lifted, manually operable means mounted on said frame, means operable thereby to swing said main arm laterally when the carriage is in any position, and means operable by the swinging movement of said main arm simultaneously to swing said supplemental transporting means laterally in the same direction, thereby to move the article supported by said supplemental transporting means in a horizontal straight line over the base or beyond the side thereof.

8. A portable hoisting machine comprising a wheel-supported base, a frame having uprights mounted thereon, a carriage mounted on said uprights, means for raising and lowering said carriage, a main arm journaled on said carriage to swing laterally, a boom rotatably mounted on the end portion of said arm extending over and lengthwise of said base, supplemental arms carried by said boom having means to support the article to be lifted, manually operative means mounted on said main frame, means operable thereby to swing said main arm laterally when the carriage is in any position, and means operable by the swinging movement of said main arm simultaneously to rotate said boom to swing said supplemental arm laterally in the same direction, thereby to move the article supported by the supplemental arms over the base or beyond the side thereof.

9. A portable hoisting machine comprising a wheel-supported base, uprights mounted thereon, a carriage mounted on said uprights, means for raising and lowering said carriage, a main arm journaled on said carriage to swing laterally, rigid supplemental transporting means rotatably mounted on the end portion of said main arm provided with means to support the article to be lifted, a sprocket rigid with said supplemental transporting means, and a sprocket chain engaging said sprocket having its ends fixedly secured to said carriage operable by the swinging movement of the main arm simultaneously to rotate said sprocket and thereby swing said supplemental transporting means laterally in the same direction of movement as that of the main arm.

10. A portable hoisting machine comprising a wheel-supported base, uprights mounted thereon, a carriage mounted on said uprights, means for raising and lowering said carriage, a main arm journaled on said carriage to swing laterally, rigid supplemental transporting means rotatably mounted on the end portion of said main arm provided with means to support the article to be lifted, a sprocket rigid with the supplemental transporting means, a sprocket chain engaging said sprocket, a nut journaled on said carriage having reversely threaded ends and complementary screw threaded members on the ends of said chain engaging said nut operable by the rotation of said nut to adjust said chain without disturbing the relative positions of said main and supplemental arms, and means for swinging said main arm laterally, thereby causing said sprocket chain and sprocket to swing the supplemental means laterally in the same direction of movement as that of the main arm.

11. A portable hoisting machine comprising a wheel-supported base, a frame having uprights thereon, a carriage mounted on said uprights, means for raising and lowering said carriage, a main arm journaled in said carriage to swing laterally, a boom rotatably mounted on the end portion of said main arm extending over and lengthwise of said base, supplemental arms rigid with said boom having means to engage and support the article to be lifted, means for swinging said main arm, a sprocket rigidly mounted on said boom, and a sprocket chain engaging said sprocket having its ends fixedly secured to said carriage operable by the swinging movement of said main arm to rotate said boom and swing the supplemental arms laterally in the same direction of movement as that of the main arm.

12. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear means for rotating said worm when the carriage is in any position, and means operable by the swinging movement of said main arm simultaneously to rotate said boom.

13. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear means for rotating said worm when the carriage is in any position, means operable by the swinging movement of said main arm simultaneously to rotate said boom, and braking means acting on the shaft of said worm operable in conjunction with said worm and worm gear automatically to lock said main and supplemental arms against swinging movement upon discontinuance of the actuation of said worm.

14. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear, means for rotating said worm when the carriage is in any position, means operable by the swinging movement of said main arm simultaneously to rotate said boom, and a spring anchored at one end of said carriage and connected at its other end to said swinging main arm in proximity to said boom extending vertically when said main arm is in vertical position and operable when the main arm is swung from upright position as a counter-balance for the weight of said main arm and boom.

15. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear, a sprocket on the shaft of said worm, a sprocket chain engaging said sprocket, an actuating sprocket mounted on the main frame, guides for said chain so positioned as to maintain engagement of said chain with said actuating gear and the sprocket of the worm shaft when the carriage is in any position, and manually operable means for rotating said actuating sprocket.

16. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear, a sprocket on the shaft of said worm, a sprocket chain engaging said sprocket, an actuating sprocket rotatably mounted on said main frame, guides for said chain so positioned as to maintain engagement of said chain with the actuating gear and the sprocket on the worm shaft when the carriage is in any position, a crank for rotating said actuating sprocket having a detachable connection thereto, and means normally maintaining said crank disengaged from said actuating sprocket to permit rotation of said actuating sprocket by the chain when the carriage is being raised or lowered.

17. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear, a sprocket on the shaft of said worm gear, a sprocket chain engaging said sprocket, a crank having a shaft slidably and rotatably mounted in bearings carried by said frame, an actuating sprocket rotatably mounted on said crank shaft engaging said chain, releasable inter-engaging means on said actuating sprocket and said crank shaft, means for guiding said sprocket chain to maintain continuous engagement of said chain with said actuating sprocket and the sprocket on the worm shaft when the carriage is in any position, and resilient means normally holding said inter-engaging means out of engagement, thereby to permit raising and lowering the carriage without rotating said crank shaft.

18. A portable hoisting machine comprising a main frame having a wheel-supported base, uprights mounted thereon, a carriage mounted on said uprights, means for raising and lowering said carriage, a main swinging arm having a pivotal shaft mounted in the bearings on said carriage, a boom rotatably mounted on the end portion of said main arm having supplemental arms provided with means to support the article to be lifted, means for swinging said main arm comprising a worm gear fixedly secured to the pivotal shaft of said main arm, a worm journaled on said carriage engaging said worm gear, a sprocket on the shaft of said worm gear, a sprocket chain engaging said sprocket, a crank having a shaft slidably and rotatably mounted in bearings carried by said frame, an actuating sprocket rotatably mounted on said crank shaft engaging said chain, releasable inter-engaging means on said actuating sprocket and said crank shaft, means for guiding said sprocket chain to maintain continuous engagement of said chain with said actuating sprocket and the sprocket on the worm shaft when the carriage is in any position, resilient means normally holding said inter-engaging means out of engagement, thereby to permit raising and lowering the carriage without rotating said crank shaft, and means operable by said resilient means to lock said crank shaft and crank against rotation during the raising and lowering of the carriage.

19. A portable side delivery hoisting machine comprising a wheel-supported base having uprights mounted thereon, a carriage mounted on said uprights having upper and lower pairs of rolls engaging respectively inner and outer guiding faces on said uprights, means for raising and lowering said carriage, a swinging main arm mounted on said carriage, rigid supplemental transporting means pivotally mounted on the end portion of said main arm having means at a distance from the pivotal axis thereof to support the object to be lifted, means for simultaneously swinging said main arm and said supplemental transporting means to move the supported article over the base or beyond the side thereof, a vertical guide mounted on said frame intermediate of said uprights, and spaced upper and lower rollers mounted on said carriage, engaging said guide, operable to prevent sideways tilting of the carriage and binding thereof on the uprights when the load is supported at one side of the vertical plane of the axis of said main arm.

20. A portable side delivery hoisting machine comprising a wheel-supported base having uprights mounted thereon, a carriage mounted on said uprights having upper and lower pairs of rolls engaging respectively inner and outer guiding faces on said uprights, means for raising and lowering said carriage, a main swinging arm mounted on said carriage, a boom pivotally mounted on the end portion of said main arm having supplemental arms provided with means to engage and support the article to be lifted, means for swinging said main arms, means operable by the swinging movement thereof to swing said supplemental arms in the same direction to move the supported article over the base or beyond the side thereof, a vertical channel-shaped guide mounted on said frame intermediate of said uprights and spaced upper and lower rollers mounted on said carriage, engaging the channel, operable to prevent sideways tilting of the carriage and binding thereof upon the uprights when the load is supported at one side of the vertical plane of the axis of said main arm.

21. A machine for transporting articles having axially alined means on opposite portions thereof adapted to be engaged by lifting mechanism, comprising a wheel-supported frame, uprights mounted thereon, a carriage mounted on said uprights, means for raising and lowering said carriage, a main arm journaled on said carriage, means for swinging said main arm laterally, a boom pivotally mounted on said main arm having parallel supplemental arms rigid therewith provided with means to engage the axially alined means of the article, and means operable by the swinging movement of said main arm to swing the supplemental arms in the same direction.

22. A machine for transporting articles having axially alined gudgeons projecting from opposite portions thereof, adapted to be engaged by a lifting mechanism, comprising a wheel-supported base, uprights mounted thereon, a carriage mounted on said uprights, means for raising and lowering said carriage, a main arm journaled on said carriage, means for swinging said main arm laterally, a boom pivotally mounted on said main arm having parallel supplemental arms provided at their ends with downwardly recessed members to engage the gudgeons on said article, and means operable by the swinging movement of said main arm to swing the supplemental arms in the same direction.

23. A machine for transporting articles having axially alined means in opposite portions thereof, adapted to be engaged by a lifting mechanism, comprising a wheel-supported frame, uprights mounted thereon, a carriage mounted on said uprights, means for raising and lowering said carriage, a main arm journaled on said carriage, means for swinging said main arm laterally, a boom pivotally mounted on said main arm having parallel supplementary arms slidably keyed to said boom and having at their ends members to engage said means in said article, means for moving said arms toward and from each other to engage or to disengage said members from the recesses of said article, and means operable by the swinging movement of said main arm simultaneously to swing the supplemental arms in the same direction.

24. A machine for transporting cylindrical articles, having a hollow central shaft, comprising a wheel-supported base, uprights mounted thereon, a carriage mounted on said uprights, means for raising and lowering said carriage, a main arm journaled on said carriage, means for swinging said main arm laterally, a boom pivotally mounted on said main arm having parallel supplemental arms slidably keyed to said boom and having at their ends members mounted in anti-friction bearings adapted releasably to engage the ends of said hollow shaft, means for simultaneously moving said arms toward and from each other to engage or to disengage said members from the hollow shaft, and means operable by the swinging movement of said main arm to swing said supplemental arms in the same direction.

25. A machine for transporting articles having axially alined means in opposite portions thereof adapted to be engaged by a lifting mechanism comprising a wheel-supported frame, uprights mounted thereon, a carriage mounted on said uprights, means for raising and lowering said carriage, a main arm journaled on said carriage, means for swinging said main arm laterally, a boom pivotally mounted on said main arm having parallel supplemental arms slidably keyed to said boom and having at their ends members adapted releasably to engage the respective alined means in the article, means for simultaneously moving said arms toward and from each other comprising parallel arms rigid with said boom and provided with alined bearings, a shaft mounted in said bearing having reversely threaded sections engaging complementary screw threads in the respective supplemental arms, a reversible electric motor mounted on said main arm, means operable by said motor for selectively rotating said shaft in either direction to cause the article-engaging members to enter or to be removed from said aligned means, and means operable by the swinging movement of said main arm to swing said supplemental arms in the same direction and thereby to move the article-engaging members of said supplemental arms in a substantially straight horizontal line.

26. A machine for transporting articles comprising a wheel-supported base, uprights mounted thereon, a carriage mounted on said uprights, means for raising and lowering said carriage, a main arm journaled in said carriage, means for swinging said main arm laterally, a boom spindle fixedly mounted in the end portion of said main arm, a cylindrical boom rotatably mounted on said spindle having parallel supplemental arms provided at their ends with axially alined bearings, a shaft rotatably mounted in said bearings, horizontal load supporting means rigidly connected to said shaft and extending horizontally therefrom, means operable by the swinging movement of said main arm to rotate said cylindrical boom thereby to swing the supplemental arms in the same direction of movement as that of the main arm, and means operable by the rotation of the cylindrical boom simultaneously to rotate the shaft of the load supporting means in such manner as to maintain the load supporting means in horizontal position throughout the swinging movement of said main and supplemental arms.

27. An article-transporting machine comprising a carriage, a main arm pivotally mounted on said carriage, rigid supplemental transporting means rotatably mounted upon said main arm of an effective length equal to that of the main arm, means pivotally mounted on the free end of the supplemental transporting means to support an article, a guiding member fixedly mounted on said carriage having a guiding surface concentric with the pivotal axis of said main arm, suitable gearing of a one to two ratio between the fixed guiding member and the supplemental transporting means operable to move the article-supporting means in a straight line during the entire swinging movements of the main arm and said supplemental transporting means, suitable gearing having a two to one ratio connecting the main swinging arm with the pivotally mounted article-supporting means operable to prevent rotation of the article-supporting means relatively to said guiding member during the entire swinging movements of the main and supplemental arms.

28. A portable hoisting machine comprising a wheel-supported base, uprights mounted thereon, a carriage movably mounted on said uprights, means for raising and lowering the carriage, a main arm journaled in said carriage, a boom pivotally mounted on the end portion of said main arm having parallel supplemental arms rigid with said boom, and horizontal article-supporting means pivotally mounted on the free ends of said supplemental arms, means for swinging said main arm, means operable thereby to rotate said boom to swing said supplemental arms in the same direction and to correlate the ratio of the angular movements of said main and supplemental arms to the ratio of the effective lengths of said main and supplemental arms to move the article-supporting means horizontally in a straight line throughout the entire swinging movement of said main and supplemental arms, and means operable by the rotation of said boom to maintain said article-supporting means in a horizontal position throughout the entire swinging movements of said main arm and supplemental arms.

29. A portable hoisting machine comprising a wheel-supported base, uprights mounted thereon, a carriage movably mounted on said uprights, means for raising and lowering said carriage, a main arm journaled in said carriage, a boom spindle fixedly mounted in the end portion of said main arm and extending lengthwise over said base, a cylindrical boom rotatably mounted on said spindle having parallel supplemental arms rigid therewith, horizontal article-supporting means having a pivotal shaft rigid therewith journaled in the free ends of said supplemental arms, means for swinging said main arm, suitable chain and sprocket mechanism operable by the swinging movement of said main arm so to rotate said boom as to swing the supplemental arms in the same direction as the direction of movement of the main arm and to correlate the ratio of angular movements of said main and supplemental arms to the ratio of the effective radial lengths of said main and supplemental arms as to cause the pivotal shaft of said article-supporting means to move in a straight line horizontally throughout the desired amplitude of movement thereof, and suitable chain and sprocket mechanism connecting the main arm and boom spindle to the pivotal shaft of the article-supporting means operable to maintain the article-supporting means in a horizontal position throughout the swinging movements of said main and supplemental arms.

RUSSELL HASTINGS, Jr.